United States Patent
Hajimiri

(10) Patent No.: US 12,038,746 B2
(45) Date of Patent: Jul. 16, 2024

(54) MODULAR AND DYNAMICALLY RECONFIGURABLE FLYING SYSTEMS ENCOMPASSING FLYING VEHICLE MODULES

(71) Applicant: California Institute of Technology, Pasadena, CA (US)

(72) Inventor: Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 650 days.

(21) Appl. No.: 16/586,549

(22) Filed: Sep. 27, 2019

(65) Prior Publication Data

US 2020/0062398 A1    Feb. 27, 2020

Related U.S. Application Data

(60) Provisional application No. 62/885,395, filed on Aug. 12, 2019, provisional application No. 62/879,684,
(Continued)

(51) Int. Cl.
    *G05D 1/00*         (2024.01)
    *B64C 37/02*      (2006.01)
    (Continued)

(52) U.S. Cl.
    CPC ........... *G05D 1/0027* (2013.01); *B64C 37/02* (2013.01); *B64C 39/02* (2013.01); *B64C 39/024* (2013.01);
(Continued)

(58) Field of Classification Search
    CPC ....... B64C 37/02; B64C 39/024; B64C 39/04; B64C 2201/027; B64C 2201/108;
(Continued)

(56) References Cited

U.S. PATENT DOCUMENTS 9,079,662 B1    7/2015    Duffy et al.
9,957,045 B1    5/2018    Daly
(Continued)

FOREIGN PATENT DOCUMENTS

WO    WO-2020049604 A1    3/2020

OTHER PUBLICATIONS

U.S. Appl. No. 16/664,635, Non-Final Office Action mailed Oct. 19, 2020.
(Continued)

*Primary Examiner* — Richard Green
*Assistant Examiner* — Steven J Shur
(74) *Attorney, Agent, or Firm* — Weaver Austin Villeneuve & Sampson LLP

(57) ABSTRACT

A flying surface may comprise a plurality of interconnectable flying vehicles configured for mid-flight reconfiguration of the flying surface. Each flying vehicle may be entirely self-sufficient, including an onboard thrust unit, an onboard controller, an onboard power unit, and connectors configured to engage corresponding connectors of other flying vehicles to form a flying surface. The flying vehicles may additionally be configured for self-control, thereby enabling a distributed control model for a flying surface that does not require significant, centralized processing power and corresponding power storage. The flying surfaces may dynamically reconfigure mid-flight by attaching or detaching flying vehicles so as to enable a wide variety of in-flight maneuvers.

15 Claims, 22 Drawing Sheets

Related U.S. Application Data filed on Jul. 29, 2019, provisional application No. 62/879,703, filed on Jul. 29, 2019, provisional application No. 62/717,220, filed on Aug. 10, 2018, provisional application No. 62/711,402, filed on Jul. 27, 2018, provisional application No. 62/711,392, filed on Jul. 27, 2018.

(51) Int. Cl.
  *B64C 39/02* (2023.01)
  *B64C 39/04* (2006.01)
  *B64U 10/13* (2023.01)
  *B64U 30/20* (2023.01)
  *B64U 101/00* (2023.01)
  *B64U 101/30* (2023.01)

(52) U.S. Cl.
  CPC .............. *B64C 39/04* (2013.01); *G05D 1/00* (2013.01); *G05D 1/104* (2013.01); *B64U 10/13* (2023.01); *B64U 30/20* (2023.01); *B64U 2101/00* (2023.01); *B64U 2101/30* (2023.01); *B64U 2201/102* (2023.01)

(58) Field of Classification Search
  CPC ........ B64C 2201/126; B64C 2201/127; B64C 2201/143; G05D 1/0027; G05D 1/104
  See application file for complete search history.

(56) References Cited

U.S. PATENT DOCUMENTS

| | | | |
|---|---|---|---|
| 10,293,936 B1 | 5/2019 | Conn et al. | |
| 11,021,223 B2 | 6/2021 | Fikes et al. | |
| 2012/0158215 A1* | 6/2012 | Sun | B64C 27/20 701/1 |
| 2014/0374532 A1* | 12/2014 | Duffy | B64C 37/02 244/2 |
| 2015/0136012 A1 | 5/2015 | Williams | |
| 2016/0123182 A1 | 5/2016 | Samaritano et al. | |
| 2016/0209839 A1 | 7/2016 | Hoareau et al. | |
| 2016/0376000 A1 | 12/2016 | Kohstall | |
| 2016/0378108 A1* | 12/2016 | Paczan | B64D 31/06 705/330 |
| 2017/0036762 A1 | 2/2017 | Gamble et al. | |
| 2017/0144757 A1 | 5/2017 | Hall et al. | |
| 2018/0088598 A1 | 3/2018 | Lection et al. | |
| 2018/0162528 A1* | 6/2018 | McGrew | B64D 5/00 |
| 2018/0231971 A1 | 8/2018 | Greenberger et al. | |
| 2019/0069379 A1 | 2/2019 | Kastee et al. | |
| 2019/0236963 A1 | 8/2019 | High et al. | |
| 2019/0329903 A1 | 10/2019 | Thompson et al. | |
| 2019/0389575 A1 | 12/2019 | Kirkbride | |
| 2020/0033851 A1 | 1/2020 | Hajimiri | |
| 2020/0094965 A1 | 3/2020 | Hajimiri | |
| 2020/0130795 A1 | 4/2020 | Fikes et al. | |
| 2021/0255644 A1 | 8/2021 | Ara et al. | |
| 2021/0325905 A1 | 10/2021 | Valentino, III et al. | |

OTHER PUBLICATIONS

WIPO Application No. PCT/US2019/053614, PCT International Search Report and Written Opinion of the International Searching Authority mailed Feb. 27, 2020.
U.S Final Office Action dated Aug. 25, 2022 in U.S. Appl. No. 16/586,687.
US Office Action dated Jan. 25, 2022 in U.S. Appl. No. 16/586,687.
US Office Action dated May 25, 2022 in U.S. Appl. No. 16/586,628.
WIPO Application No. PCT/US2019/053614, PCT International Preliminary Report on Patentability mailed Feb. 2, 2021.
U.S. Non-Final Office Action dated Dec. 23, 2022 in U.S. Appl. No. 16/586,628.
U.S. Non-Final Office Action dated Mar. 20, 2023 in U.S. Appl. No. 16/586,687.
U.S. Final Office Action dated Aug. 22, 2023, in U.S. Appl. No. 16/586,687.
U.S. Non-Final Office Action dated Jun. 5, 2023, in U.S. Appl. No. 16/586,628.
U.S. Non-Final Office Action dated Dec. 13, 2023 in U.S. Appl. No. 16/586,687.
U.S. Notice of Allowance dated Dec. 12, 2023 in U.S. Appl. No. 16/586,628.

* cited by examiner

MODULAR AND DYNAMICALLY RECONFIGURABLE FLYING SYSTEMS ENCOMPASSING FLYING VEHICLE MODULES

CROSS-REFERENCE TO RELATED APPLICATIONS

This patent application claims priority from: U.S. Provisional Appl. Ser. No. 62/711,392, filed Jul. 27, 2018; U.S. Provisional Appl. Ser. No. 62/711,402, filed Jul. 27, 2018; U.S. Provisional Appl. Ser. No. 62/717,220, filed Aug. 10, 2018; U.S. Provisional Appl. Ser. No. 62/879,684, filed Jul. 29, 2019; U.S. Provisional Appl. Ser. No. 62/879,703 filed Jul. 29, 2019 and U.S. Provisional Appl. Ser. No. 62/885,395 filed Aug. 12, 2019, all of which are incorporated herein by reference in their entirety.

BACKGROUND

Flying apparatus, such as drones rely on generating sufficient thrust to produce lift. In many examples this is achieved by electrically powered propellers, very broadly used today in drones, such as quadcopters, where four motors control four propellers to achieve lift, lateral movement, and attitude control. While electrically powered motors facilitate operation of multiple propellers to provide maneuvering and control flexibility, all electrically powered aircraft are challenged by the amount of energy required to be carried on board, which through the battery mass increases the required lift, which in turn translates to more energy demand.

Moreover, traditional flying apparatuses rely on centralized, onboard control and power supply units for controlling and/or powering a rigid plurality of thrust units, such as a plurality of motors with corresponding propellers (a quadcopter with four propellers, a hexcopter with six propellers, and/or the like). This centralized control and power configuration provides practical limits on the overall physical configuration of the flying apparatus so as to maintain practical operability of the apparatus. However, these physical limitations also limit potential uses of the flying apparatus, and also limit the flexibility of the flying apparatus to be configured for specific desired operations.

BRIEF SUMMARY

Various embodiments are directed to individual flying vehicles, and interconnected systems of flying vehicles forming flying surfaces 100. The individual flying vehicle may be entirely self-sufficient, having controllers, power units (e.g., batteries, wireless power receivers, and/or the like), and thrust units onboard each flying vehicle. The flying vehicles comprise connectors thereon for interconnecting a plurality of flying vehicles to form a flying surface 100, and the controllers of the flying vehicles are configured for decentralized control of an interconnected flying surface 100 to perform various operations. Moreover, methods of operating the individual flying vehicles and/or the flying surfaces 100 utilize the decentralized control configuration enabled by the plurality of controllers associated with respective flying vehicles to dynamically reconfigure the flying surfaces 100 in accordance with a desired functionality of the flying surfaces 100.

Various embodiments are directed to a flying vehicle comprising: a frame having one or more connectors configured to engage external connectors of at least one adjacent flying vehicle to form a joint between the frame and the at least one adjacent flying vehicle; a thrust unit secured within the frame and configured to provide lift for the flying vehicle; and a controller secured within the frame, wherein the controller is configured to: determine a connectivity state of the flying vehicle, wherein the connectivity state is indicative of whether the frame is secured relative to at least one adjacent flying vehicle; transmit control signals to the thrust module, wherein the control signals are generated based at least in part on the connectivity state of the flying vehicle.

In certain embodiments, the flying vehicle further comprises a communication module configured to transmit status data to one or more additional flying vehicles. Moreover, the communication module may be configured for wireless data transmission.

In various embodiments, the one or more connectors are configured to form a rigid joint when engaged with external connectors of at least one adjacent flying vehicle. Moreover, the one or more connectors are configured to form a flexible joint when engaged with external connectors of at least one adjacent flying vehicle. In various embodiments, the one or more connectors are configured to form a dynamically adjustable joint when engaged with external connectors of at least one adjacent flying vehicle, wherein the dynamically adjustable joint has a dynamically controllable rigidity. In certain embodiments, the one or more connectors are configured to form an adjustable joint when engaged with external connectors of at least one adjacent flying vehicle, wherein the adjustable joint is configurable between a rigid configuration and a flexible configuration. In certain embodiments, the controller is further configured to receive a master control signal from one of an additional flying vehicle prior to transmitting control signals to the thrust module. In various embodiments, the controller is configured to generate a control signal based at least in part on a distributed control configuration for a plurality of flying vehicles. Moreover, determining a connectivity state comprises detecting wireless signals received by at least one adjacent flying vehicle. In certain embodiments, the flying vehicle may further comprise one or more proximity sensors positioned on the frame, wherein the one or more proximity sensors are configured to detect an adjacent flying vehicle.

In certain embodiments, the thrust unit is reversible to selectably provide thrust in one of two opposing directions. In various embodiments, the flying vehicle further comprises one or more control surfaces configured to provide attitude adjustment to the flying vehicle. In certain embodiments, the controller is further configured to: generate master control signals for one or more additional flying vehicles; and transmit the master control signals to the one or more additional flying vehicles. Moreover, the flying vehicle may further comprise an onboard power unit. The flying vehicle may further comprise a power receiver configured to receive wireless power transmission from a power generation unit. In certain embodiments, the power receiver is embodied as one or more antennae positioned within the thrust unit.

Certain embodiments are directed to a flying vehicle comprising: a frame defining one or more sidewalls, wherein the frame has an open upper end and an open lower end; a thrust unit secured within the frame and configured to provide lift for the flying vehicle; a power unit in connection with the thrust unit; a controller configured to transmit control signals to the thrust unit; and a plurality of connectors positioned around an exterior surface of the frame, wherein the connectors are configured to engage external connectors of at least one adjacent flying vehicle.

In various embodiments, each of the plurality of connectors may be hermaphrodite connectors. Moreover, the one or more connectors are configured to form a rigid joint when engaged with external connectors of at least one adjacent flying vehicle. In certain embodiments, the one or more connectors are configured to form a flexible joint when engaged with external connectors of at least one adjacent flying vehicle. In certain embodiments, the one or more connectors are configured to form a dynamically adjustable joint when engaged with external connectors of at least one adjacent flying vehicle, wherein the dynamically adjustable joint has a dynamically controllable rigidity. In various embodiments, the one or more connectors are configured to form an adjustable joint when engaged with external connectors of at least one adjacent flying vehicle, wherein the adjustable joint is configurable between a rigid configuration and a flexible configuration. In certain embodiments, the thrust unit comprises an electric motor and propeller. Moreover, the flying vehicle may further comprise one or more proximity sensors positioned on the frame, wherein the one or more proximity sensors are configured to detect an adjacent flying vehicle. The thrust unit may be reversible to selectably provide thrust in one of two opposing directions. Moreover, the flying vehicle may further comprise one or more control surfaces configured to provide attitude adjustment to the flying vehicle.

Certain embodiments are directed to a flying surface comprising: a plurality of interconnected flying vehicles each comprising a thrust module and a controller, wherein adjacent flying vehicles of the plurality of flying vehicles are connected via a joint formed between connectors of the adjacent flying vehicles; and wherein the controller of each of the plurality of interconnected flying vehicles are configured for distributed flight control of the flight surface.

In various embodiments, adjacent flying vehicles of the plurality of flying vehicles are connected via a flexible joint. In certain embodiments, adjacent flying vehicles of the plurality of flying vehicles are connected via a rigid joint. Moreover, adjacent flying vehicles of the plurality of flying vehicles are connected via connectors configured for transmission of at least one of: control data signals or power signals. In certain embodiments, each flying vehicle comprises a power unit. Moreover, at least one flying vehicle of the plurality of interconnected flying vehicles may be configured for sharing power from a power unit with one or more other flying vehicles of the plurality of interconnected flying vehicles. In certain embodiments, each controller of the plurality of interconnected flying vehicles is configured to independently generate control signals for the onboard thrust unit. Moreover, each of the plurality of interconnected flying vehicles may additionally comprise one or more position sensors, and wherein each controller of the plurality of interconnected flying vehicles is configured to generate control signals for the onboard thrust unit based at least in part on outputs of the one or more position sensors. Each controller of the interconnected flying vehicles may be configured to independently generate control signals for the onboard thrust unit based at least in part on command signals received from an external controller.

In various embodiments, generating control signals for the onboard thrust unit comprises: determining, based at least in part on the output of the one or more position sensors, a connectivity state of the corresponding flying vehicle relative to one or more adjacent flying vehicles; and generating control signals for movement of a corresponding flying vehicle based at least in part on a determined connectivity state of the corresponding flying vehicle. In various embodiments, each controller of the plurality of interconnected flying vehicles is configured to receive a control signal from an external control device. In various embodiments, each flying vehicle comprises a wireless power receiver configured to receive wireless power transmissions from an external power source. Moreover, one or more of the plurality of interconnected flying vehicles additionally comprise a photovoltaic element. In certain embodiments, at least one of the interconnected flying vehicles comprises a camera. In various embodiments, at least one of the interconnected flying vehicles comprises at least one of: a GPS sensor; a radar; a LIDAR sensor; a thermal sensor; a pressure sensor; a gyroscope; a contact sensor; or a proximity sensor.

Moreover, at least one of the interconnected flying vehicles may comprise a beacon. In certain embodiments, at least one of the interconnected flying vehicles comprises a wireless data network repeater. In various embodiments, the controllers of the plurality of interconnected flying vehicles are collectively configured to maneuver portions of the flying surface for object manipulation by independently controlling thrust units of the plurality of interconnected flying vehicles. In various embodiments, the controllers of the plurality of interconnected flying vehicles are collectively configured to maintain the flying surface in an at least substantially stationary position to modify an airflow at the stationary position. Moreover, the plurality of the interconnected flying vehicles may be arranged in more than one layer. In certain embodiments, one or more of the plurality of the interconnected flying vehicles further comprises one or more one or more control surfaces configured to provide attitude adjustment to the flying vehicle. Moreover, the controllers of the plurality of interconnected flying vehicles are collectively configured to reconfigure an overall shape of the flying surface between a first configuration and a second configuration during flight.

Various embodiments are directed to a method for dynamically configuring a flying surface comprising a plurality of interconnectable flying vehicles. In certain embodiments, the method comprises: detecting, via a controller of a first interconnectable flying vehicle, the presence of a second interconnectable flying vehicle; controlling, via the controller of the first interconnectable flying vehicle, an onboard thrust unit of the first interconnectable flying vehicle to cause the first interconnectable flying vehicle to form a joint by engaging one or more connectors of the first interconnectable flying vehicle and the second interconnectable flying vehicle and to form a flying surface comprising the first interconnectable flying vehicle and the second interconnectable flying vehicle.

In various embodiments, engaging one or more connectors of the first interconnectable flying vehicle and the second interconnectable flying vehicle comprises forming a rigid joint between the first interconnectable flying vehicle and the second interconnectable flying vehicle. Moreover, engaging one or more connectors of the first interconnectable flying vehicle and the second interconnectable flying vehicle may comprise forming a flexible joint between the first interconnectable flying vehicle and the second interconnectable flying vehicle.

In certain embodiments, the method may further comprise reconfiguring the rigid joint into a flexible joint. Moreover, after engaging the one or more connectors between the first interconnectable flying vehicle and the second interconnectable flying vehicle, reconfiguring a control model executed by the controller of the first interconnectable flying vehicle to accommodate flight behaviors of the flying surface. In certain embodiments, reconfiguring the control model comprises: detecting a joint type between the first interconnectable flying vehicle and the second interconnectable flying vehicle; detecting a quantity of interconnectable flying vehicles connected within the flying surface; and implementing a control model reflecting the detected joint type and the detected quantity of interconnectable flying vehicles connected within the flying surface.

Moreover, reconfiguring the control model may comprise receiving one or more control signals from a separate controller and implementing a control model at the controller of the first interconnectable flying vehicle based at least in part on the received one or more control signals. In various embodiments, reconfiguring the control model comprises: detecting that the second interconnectable flying vehicle comprises a camera; and implementing a control model configured for stable repositioning of the camera. In certain embodiments, the method further comprises detecting a failing third interconnectable flying vehicle within the flying surface; and reconfiguring the control model of the first interconnectable flying vehicle to support the failing third interconnectable flying vehicle. In certain embodiments, detecting the presence of a second interconnectable flying vehicle comprises detecting, via one or more of: a proximity sensor, a pressure sensor, or a contact sensor.

Various embodiments are directed to a method for dynamically configuring a flying surface comprising a plurality of interconnectable flying vehicles, the method comprising: detecting, via a controller of a first interconnectable flying vehicle, the presence of a second interconnectable flying vehicle connected with the first interconnectable flying vehicle via a joint; and configuring a control model implemented by the controller of the first interconnectable flying vehicle based at least in part on a detection of the presence of the second interconnectable flying vehicle.

In certain embodiments, the method further comprises detecting a joint type between the first interconnectable flying vehicle and the second interconnectable flying vehicle. Moreover, detecting a joint type comprises determining whether a joint is a rigid joint or a flexible joint between the first interconnectable flying vehicle and the second interconnectable flying vehicle.

In certain embodiments, the method further comprises receiving data indicating a quantity of other interconnectable flying vehicles connected with the second interconnectable flying vehicle. In various embodiments, the method further comprises receiving data indicating that the second interconnectable flying vehicle comprises a camera. In various embodiments, reconfiguring the control model comprises implementing a control model configured for stable repositioning of the camera. Moreover, reconfiguring the control model may comprise receiving one or more control signals from a separate controller.

In certain embodiments, the method further comprises detecting an operating status of the second interconnectable flying vehicle and configuring the control model based at least in part on the operating status of the second interconnectable flying vehicle. In certain embodiments, detecting the presence of a second interconnectable flying vehicle connected with the first interconnectable flying vehicle via the joint comprises receiving a data signal from the second interconnectable flying vehicle via a data connection within the joint. Moreover, detecting the presence of a second interconnectable flying vehicle connected with the first interconnectable flying vehicle via the joint may comprise receiving a wireless data signal from the second interconnectable flying vehicle.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1A:
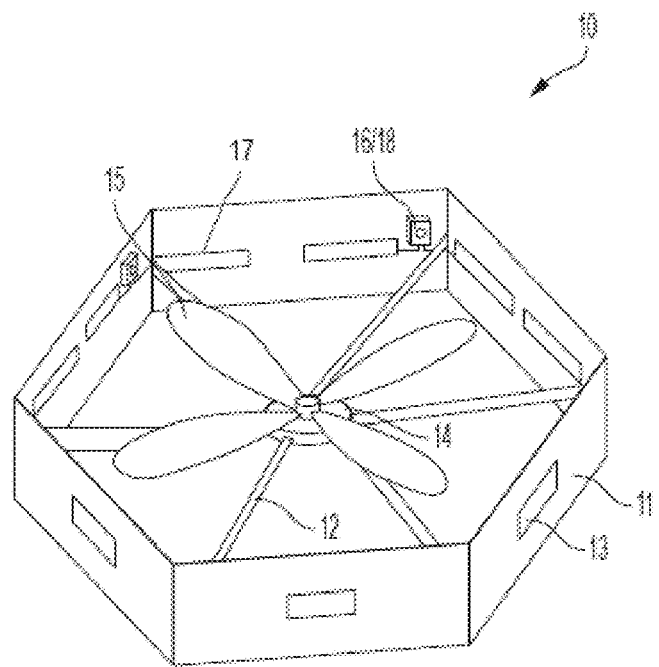
FIGS. 1A-1B are schematic illustrations of flying vehicles in accordance with certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Flying vehicles in accordance with various embodiments may be configured to operate in concert with one another as interconnectable flying vehicles comprising connectors enabling interconnection between adjacent flying vehicles. Each flying vehicle may be entirely self-sufficient, with one or more onboard thrust units, one or more onboard controllers, one or more onboard power units (e.g., which may be entirely self-contained, or may be configured to receive power from an external power source, such as via wireless power transmission from a power generation unit), and/or other features (e.g., sensors, transmitters/receivers, and/or the like). Moreover, the flying vehicles may be configured to operate within a swarm configuration (e.g., each of a plurality of flying vehicles, or a subset, operating as separate vehicles within a grouping of flying vehicles) and/or as a module of a flying surface (e.g., each of a plurality of flying vehicles operating as an interconnected portion of a flying surface).

In various embodiments, a flying surface may be embodied as a rigid flying surface (also referred to herein as a flying plank) characterized by rigid joints between interconnected flying vehicles. In other embodiments, the flying surface may be embodied as a flexible flying surface (also referred to herein as a flying shroud or a flying carpet) characterized by flexible joints between interconnected flying vehicles. In certain embodiments, the joints between flying vehicles (a joint comprising connectors of each of two interconnected flying vehicles) may be controllable between a rigid and flexible configuration (e.g., a digital configuration, selectable between rigid or flexible configurations or a variable configuration, selectable between varying degrees of rigidity).

While forming a portion of a flying surface, the flying vehicles' onboard controllers may be configured to control the movement/operation of the flying surface in a distributed control configuration. Each controller may operate independently to determine appropriate control signals for control of a respective flying vehicle, for example, based on a determined desired movement pattern/operation of the flying surface as a whole and/or based on a connectivity state of the flying vehicle (e.g., indicating whether the flying vehicle is attached to another, adjacent flying vehicle and/or indicating the position of the flying vehicle within a flying surface). The controllers can also use additional information from on board sensors (e.g., microelectromechanical systems (MEMS) accelerometers, gyroscopes, magnetometers, barometers, miniaturized sonar, radar, LIDAR, GPS, visible and infrared imagers and cameras, and/or the like) to appropriately control a flying vehicle and/or flying surface. In other embodiments, one or more controllers of individual flying vehicles may be configured to operate as slave controllers, executing control commands received from a separate master controller (which may be embodied as a controller of another flying vehicle, or a separate controller device).

In practice, a plurality of flying vehicles may takeoff as individual vehicles or as an interconnected flying surface, or any combination thereof. The flying vehicles may reconfigure during flight (e.g., by attaching relative to one another to form a flying surface and/or by detaching from one another into a swarm or otherwise into a plurality of separate flying vehicles).

Flying Vehicle

Figure 1B:
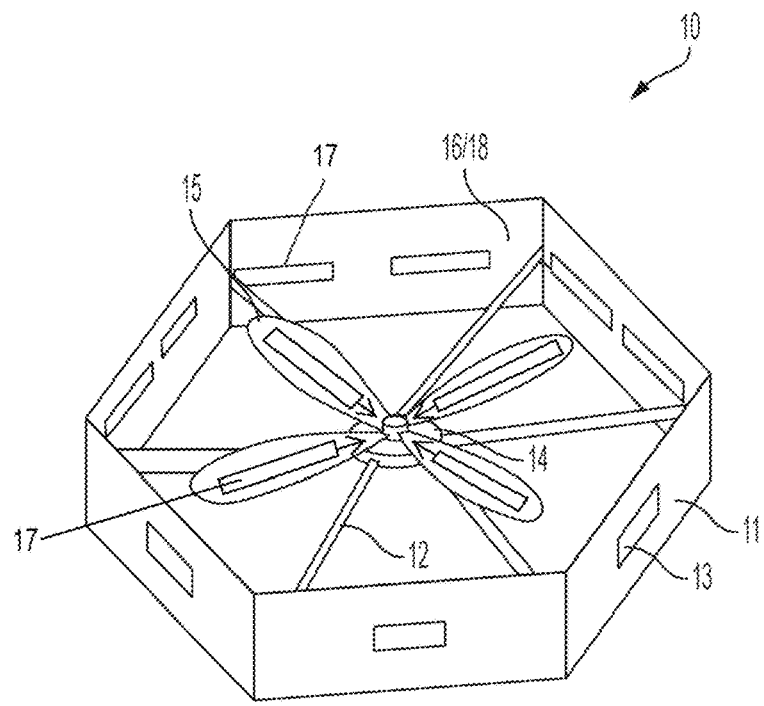
Figure 2:
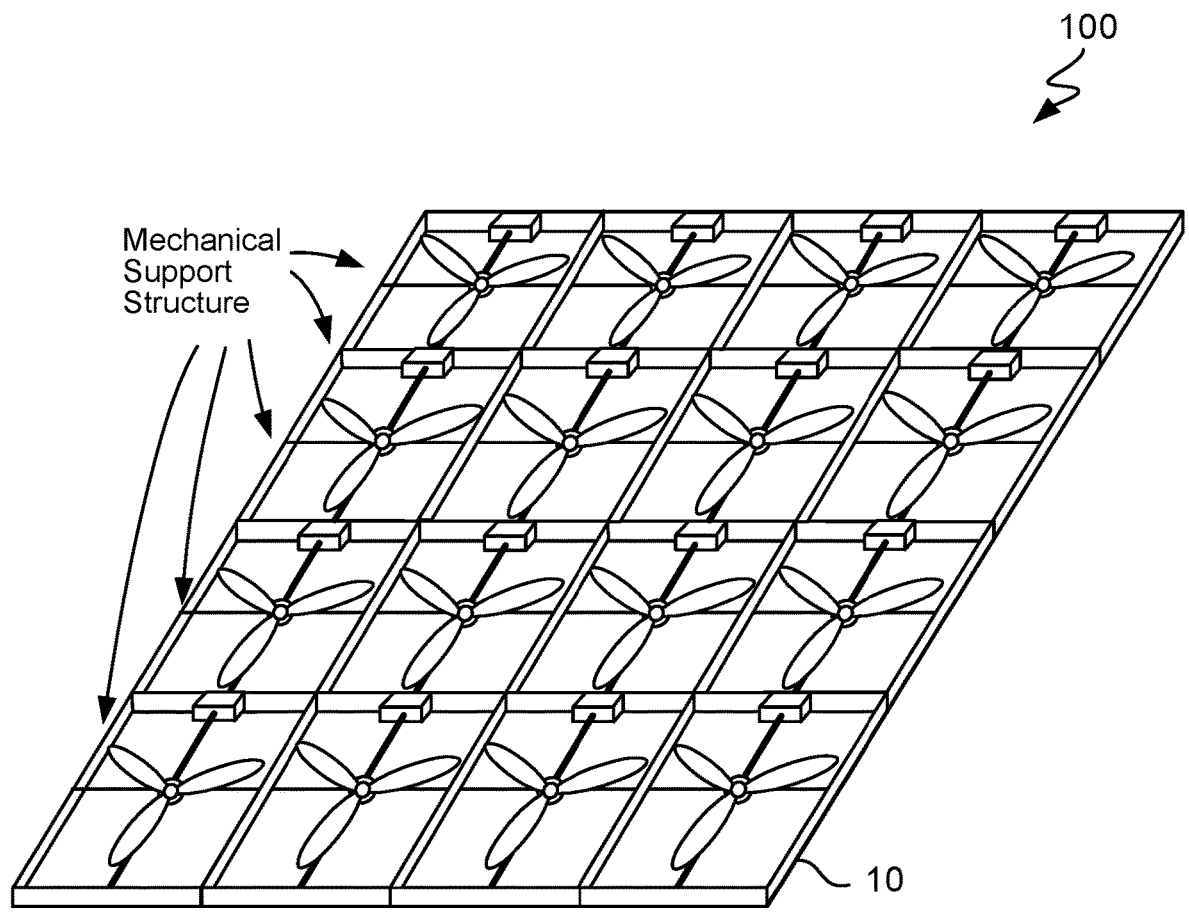
FIG. 2 is a schematic illustration of a flying surface 100 arranged in a rectangular configuration in accordance with certain embodiments.
Figure 3A:
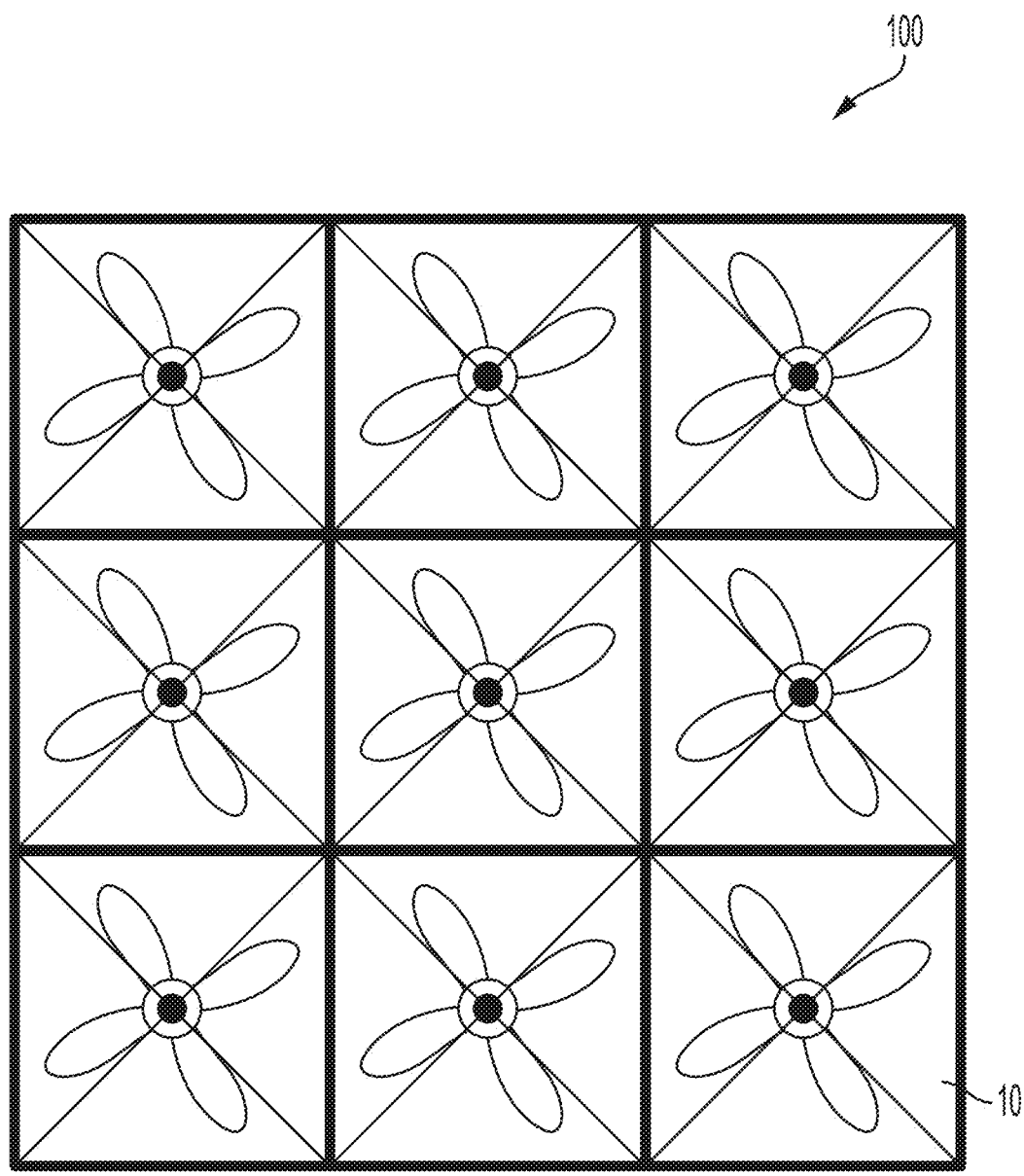
FIGS. 3A-3B are schematic representations of various arrangements of flying vehicles connected to form flying surfaces 100 according to certain embodiments.
Figure 3B:
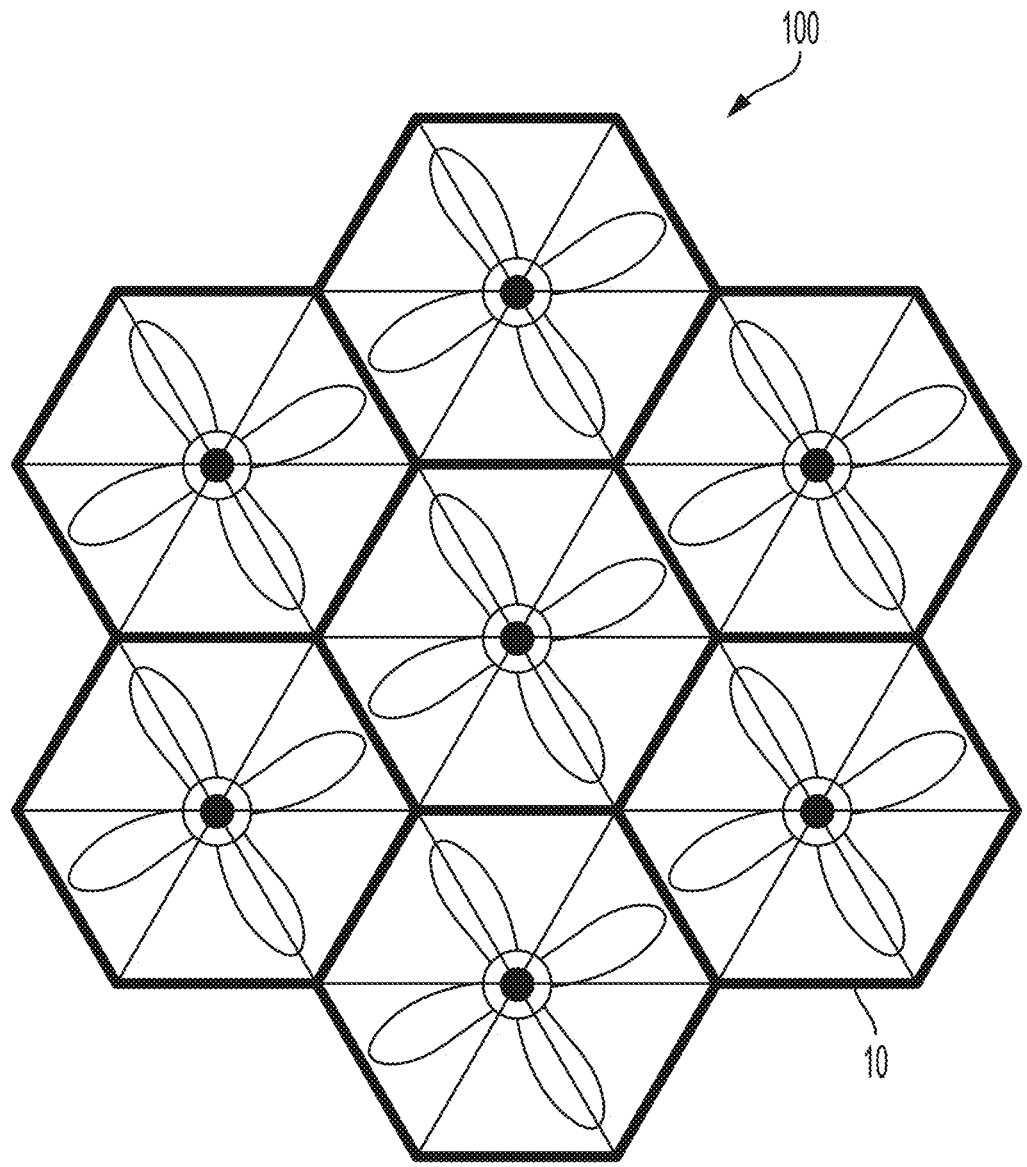

FIGS. 1A-1B illustrate example embodiments of a flying vehicle 10 according to various embodiments. As shown in FIGS. 1A-1B, a flying vehicle 10 may comprise a frame 11 supporting a plurality of subcomponents therein. As shown in FIGS. 1A-1B, the frame 11 may comprise one or more outer walls (collectively defining a housing) defining an outer perimeter of the flying vehicle 10. The one or more outer walls may define an exterior surface (defining an exterior surface of the flying vehicle 10) and an interior surface (surrounding an interior of the flying vehicle 10). As shown in FIGS. 1A-1B, the outer walls may be configured in a hexagon configuration, although any of a variety of shapes may be utilized. For example, as shown in FIG. 2, discussed in greater detail herein, the outer walls may be configured in a rectangular (e.g., square) configuration. Other example outer wall configurations encompass round (also referred to herein as circular) configuration, oval-shaped configurations, elliptical configurations, triangular configurations, pentagon-shaped configurations, and/or the like.

As shown in FIGS. 1A-1B, the frame 11 may define an open upper end and/or an open lower end, enabling air flow through the frame 11. In certain embodiments, a protective mesh, grid, surface, or other sheet (e.g., a flexible sheet or rigid sheet) that does not substantially impede air flow through the frame 11 may cover the open upper end and/or the open lower end, such as to provide protection against user contact with the thrust unit within the frame 11. The grid can also be used to impart certain aerodynamic properties to the airflow (e.g., laminar flow) or modify the airflow. As discussed herein, a flying vehicle 10 may comprise one or more control surfaces to modify air flow through a flying vehicle 10, and a grid, surface, protective mesh, and/or the like may be embodied as control surfaces providing attitude control of the flying vehicle 10.

The one or more outer walls may be solid panels, mesh panels, interconnected tubes, interconnected rods, a hollow frame, and/or the like. The one or more outer walls may be configured to operate as air foils to direct air through the flying vehicle 10. In certain embodiments, the one or more outer walls may be configured to generate a venturi effect incorporating air movement by the thrust unit, to pull air into and through the frame 11 of the flying vehicle 10 to generate efficient air movement through the flying vehicle 10. The outer walls can also be used to induce control action by acting as primary or secondary control surfaces.

Moreover, the frame 11 may comprise one or more structural supports, such as cross-braces 12 extending across the interior of the flying vehicle 10. As shown in FIGS. 1A-1B, the structural supports may be configured to support one or more subcomponents, such as thrust units, controllers, and/or the like as discussed herein. The structural supports may each extend entirely across the interior of the flying vehicle 10, or the structural supports may extend between an interior surface of an outer wall to a portion of a subcomponent (e.g., to a portion of a thrust unit).

The frame 11 may comprise rigid and/or flexible materials in certain embodiments. For example, the entirely of a frame 11 may comprise rigid materials, thereby providing a fully rigid flying vehicle 10. In other embodiments, at least a portion of a frame 11 may comprise flexible materials, thereby providing intra-vehicle flexibility for a flying vehicle 10 (and a flying surface encompassing such a flying vehicle 10). As examples, the frame 11 of a flying vehicle 10 may comprise any of a plurality of materials, such as carbon fiber, magnesium, titanium, aluminum, polyimide, enforced rubber, fiber glass, plastics, polymer materials, and/or the like. As just one example, the one or more outer walls may comprise a first material, and one or more structural supports may comprise a second material. As another example, all components of the frame 11 may comprise a single material.

Moreover, as shown in FIGS. 1A-1B, the flying vehicle 10 comprises one or more connectors 13 positioned on an exterior surface of the outer walls and configuring the flying vehicle 10 as an interconnectable flying vehicle. As just one example, the connectors 13 may be positioned at regular intervals around an exterior perimeter of the flying vehicle 10. As a specific example, each individual outer wall may comprise at least one connector 13. As another example, an outer wall may comprise a plurality of connectors 13 spaced along a length of the outer wall (e.g., a circular flying vehicle 10 comprising a single, continuously curved outer wall may comprise a plurality of connectors 13 spaced at regular intervals around the perimeter of the flying vehicle 10, or a ring connect capable of connecting at any point along its outer perimeter).

In certain embodiments, the connectors 13 may each be identified by a connector identifier indicative of the relative location of the connector on the flying vehicle 10. The connector identifiers may be stored within the controller 18 of the flying vehicle 10 (e.g., a memory of the controller 18), such that the controller 18 is enabled to determine where interconnected flying vehicles 10 are connected relative to the particular flying vehicle 10. For example, the connector identifiers may comprise "left," "right," "front," and "back" (the names may be arbitrarily assigned, as the flying vehicle 10 may be capable of identical performance of operation in any direction), such that a controller 18 may determine whether other flying vehicles 10 are connected, for example, on a single side of the flying vehicle 10, on adjacent (e.g., perpendicular) sides of the flying vehicle 10, on opposite sides of the flying vehicle 10, on all sides of the flying vehicle 10, and/or the like.

In certain embodiments, the connectors 13 may comprise hermaphrodite connectors, such that identical connectors 13 are configured for interconnection to form a joint therebetween. Thus, each connector 13 on each flying vehicle 10 may be capable of forming a joint with every other connector 13 of other flying vehicles 10. However, it should be understood that the connectors 13 may be embodied as male-style connectors and female-style connectors, such that a male-style connector is configured for interconnection with a female-style connector to form a joint.

In certain embodiments, the connectors 13 may be configured for interconnection therebetween without external intervention. Such connectors 13 may be engaged to interconnect between connectors 13 by minimal pressure that may be generated by controlling the movement of two flying vehicles 10 toward one another. The connectors may be pressure-fit style connectors, snap-fit style connectors, interference-fit style connectors, static magnetic connectors or electrically controlled magnetic (e.g., electromagnetic connectors), and/or the like. In certain embodiments, joints formed between connector pairs (comprising a first connector of a first flying vehicle and a second connector of a second flying vehicle) may be separated without external intervention. As an example, a specific relative movement pattern of connected flying vehicles 10 may be utilized to disconnect a joint (e.g., a first flying vehicle 10 moving in a downward direction and a second flying vehicle 10 moving in an upward and twisting direction). As another example, an actuator on one flying vehicle 10 disengaging a corresponding engagement component on a second flying vehicle 10. In other embodiments however, joints formed between connector pairs may be separated only with external aid (e.g., a user/tool interacting with portions of the joint to separate the connectors). In yet other embodiments the joints may be formed or facilitated using electromagnets that may be activated to form a connection between adjacent flying vehicles 10 and turned off to disengage previously connected adjacent flying vehicles 10. Such magnetic connectors may be aided by miniaturized magnetic sensors on the outer wall that are configured to detect the magnetic field of the adjacent flying vehicle(s) and provide feedback in the alignment and attachment process.

In certain embodiments, the connectors 13 may be passive connectors that do not utilize/require power to form joints. For example, snap-fit connectors, hook-and-loop connector/fasteners, static magnetic connectors, and/or the like may form joints between connectors 13 simply based on pressure applied between connectors. In other embodiments, the connectors 13 may comprise active connectors that utilize power to form joints. For example, actuated pin joints may utilize an actuator (e.g., a linear actuator, a motor, a solenoid, and/or the like) to interconnect connectors 13 to form a joint. As another example, electromagnetic connectors may maintain joints in a connected configuration until depowering of the electromagnetic connector or be used as means of achieving adjustable stiffness by controlling the magnetic field strength. In yet other embodiments, the connectors 13 may comprise semi-active connectors that utilize power to separate joints but do not utilize power to form joints. For example, interlocking pin joints may be formed between connectors 13 simply based on minimal pressure formed between connectors 13, however an integrated actuator may be utilized to separate the connectors 13 of the joint. It should be understood that other semi-active connectors utilize power to form joints but do not utilize power to separate joints.

In certain embodiments, the connectors 13 may comprise a rigid material, such as a metal material, a rigid polymer, and/or the like, and may be configured to generate rigid joints between connected flying vehicles 10. In other embodiments, the rigid material connectors may be configured to generate flexible, hinged or pinned joints between connected flying vehicles 10. In yet other embodiments, the connectors 13 may comprise flexible or resilient materials, such as composite materials, memory metals, rubber materials, flexible polymer materials, and/or the like, such that the connectors 13 are configured to generate flexible joints between connected flying vehicles 10. In yet other examples, the connectors 13 may be embodied as dynamically adjustable joints with a dynamically controllable rigidity. For example, dynamically adjustable joints may comprise dynamically adjustable materials and/or joint configurations having adjustable rigidity (e.g., by applying an electrical signal to the material, by moving a rigid component within the connector 13, by tightening/loosening a pivot joint to increase/decrease frictional forces within a joint, and/or the like). Moreover, as discussed herein, the connectors 13 may comprise conducting components configured for power transmission and/or data transmission between connected flying vehicles 10 (e.g., between controllers of connected flying vehicles 10).

In various embodiments, the connectors 13 may comprise proximity sensors, pressure sensors, contact sensors, magnetic field sensors, and/or the like to facilitate reconfiguration between adjacent, connected flying vehicles 10. In other embodiments, such sensors may be positioned at one or more locations on an outer surface of a flying vehicle 13 (e.g., adjacent connectors 13). For example, proximity sensors may be configured to detect the presence of a nearby flying vehicle 10 for which connection is desired, and/or to measure the distance to a surface of the detected flying vehicle 10, and/or relative orientation or conformation. Thus, a controller of a flying vehicle 10 as discussed herein is configured to utilize outputs of a proximity sensor (or other sensor type) to determine appropriate control maneuvers for the flying vehicle 10 to enable connection with another flying vehicle 10. Pressure sensors and/or contact sensors (e.g., positioned within and/or adjacent connectors 13) may be used to confirm connection between flying vehicles 10.

As shown in FIGS. 1A-1B, the flying vehicle 10 additionally comprises a thrust unit, embodied as a motor 14 and propeller 15 in the illustrated embodiment, although other thrust units may be utilized in certain embodiments (e.g., a fossil fuel-based engine and propeller, a jet propulsion unit (e.g., a jet engine), and/or the like). The thrust unit is configured to provide lift for the flying vehicle 10. As illustrated in FIG. 1A-1B, the thrust unit is secured within the frame 11 of the flying vehicle 10 (e.g., secured relative to structural supports extending across at least a portion of the interior of the flying vehicle 10). As just one example, the structural supports may extend between interior surfaces of side walls of the frame 11 to a housing of a motor of the thrust unit (e.g., a motor associated with a propeller of the thrust unit). In certain embodiments, the thrust unit may be rigidly secured within the flying vehicle 10, such that the thrust unit cannot pivot within the flying vehicle 10. However, in other embodiments, the thrust unit may be pivotably mounted within the flying vehicle 10, such that the thrust unit may provide attitude control for the flying vehicle 10, as well as other multi-dimensional movement control. In embodiments in which the thrust unit is pivotably mounted within the flying vehicle 10, the pivoting position of the thrust unit may be controlled via an onboard controller (e.g., via one or more motors (e.g., servo motors) controlled by the onboard controller).

In other embodiments, it should be understood that a flying vehicle 10 may comprise one or more control components to provide separate attitude control for the flying vehicle 10. For example, the flying vehicle 10 may comprise one or more control surfaces, such as rudders, trim flaps, and/or other control surfaces that may be operably secured relative to an open upper end or an open lower end of the flying vehicle 10 so as to modify airflow generated by the thrust unit, thereby enabling control of the flying vehicle 10 by adjustment of the control surfaces. The control surfaces may be operable by motors, solenoids, or other mechanical movement mechanisms in communication with the onboard controller 18, thereby enabling independent movement of the control surfaces so as to provide attitude control for a flying vehicle 10. As discussed in greater detail herein, the control surfaces of one or more flying vehicles 10 may be utilized in combination with other, separate flying vehicles 10 (such as a plurality of flying vehicles 10 arranged in a single flying surface 100) so as to provide additional attitude control for the plurality of flying vehicles, such as within a single flying surface 100. In such embodiments, a plurality of flying vehicles 10 may be arranged in multiple layers (e.g., a flying surface 100 may comprise one or more flying surfaces 100 arranged in multiple layers (e.g., utilizing flexible joints) such that the flying vehicles 10 of a first layer may operate as control surfaces for flying vehicles 10 within a second layer. In such embodiments, one or more flying vehicles 10 within the first layer are deactivated, such that only the included control surfaces are used, specifically to provide attitude control for thrust provided by flying vehicles 10 within the second layer.

Moreover, the thrust unit of a flying vehicle 10 may be embodied as a single thrust-providing mechanism, such as a single propeller operated via a single motor. However, it should be understood that the thrust unit of certain embodiments comprises a plurality of thrust-providing mechanisms, such as a plurality (e.g., two, three, four, five, six, and/or the like) of motor and propeller combinations, mounted within the frame 11 of the flying device 10. Moreover, in certain embodiments the thrust unit may be reversible (e.g., to provide thrust in one of opposing directions). In the illustrated embodiment, the motor may be configured to rotate the propeller in one of two opposite directions (e.g., clockwise or counter-clockwise), so as to provide lift in either direction. Such thrust unit capability may enable additional movements of a flying vehicle 10 and/or flying surface 100.

Moreover, the flying device 10 of the illustrated embodiments of FIGS. 1A-1B further comprises an onboard power unit 16, such as a battery (e.g., a rechargeable battery, such as a lithium-ion battery; a plurality of non-rechargeable primary batteries; and/or the like) configured to provide electric power to the controller 18, the thrust unit (e.g., a motor of the thrust unit), one or more communication modules, and/or the like. The power unit 16 may be secured relative to the frame 11 of the flying vehicle 10. Although not illustrated, in certain embodiments the power unit 16 may be in electrical communication with one or more terminals of the one or more connectors 13, such that the power unit 16 may provide electrical power or control and sensing information to one or more connected flying devices 10, and/or such that the power unit 16 may receive electrical power from one or more connected flying devices 10. In other embodiments, the power unit 16 may have an integrated short-range (or long-range) wireless power transmitter/receiver, such that the power unit 16 may wirelessly transmit and/or receive power to/from one or more connected flying devices 10. Moreover, as will be discussed in greater detail herein, the power unit 16 may be in communication with one or more wireless power antennae 17 and rectification units configured for receiving and/or transmitting power to/from a power generation unit 90 and for converting the received energy to DC energy, for example, to drive a motor 14. Thus, in certain embodiments, each flying vehicle 10 is configured to receive wireless power transmissions, such as RF power transmissions (as well as control data transmissions), microwave power transmissions, and/or the like. As shown in FIGS. 1A-1B, the wireless power antennae 17 may be secured relative to or otherwise integrated within the frame 11, the wireless power antennae 17 may be secured relative to and/or may be incorporated within a thrust unit (e.g., as a portion of a propeller 15, such as a dipole antennae with corresponding rectifier). As discussed herein, the wireless power antennae 17 and rectifier units may be in communication with a power storage unit (e.g., a battery), however it should be understood that in certain embodiments the wireless power antennae 17 and rectifier circuitry may be in direct electrical communication with the thrust unit (e.g., the motor 14 of the thrust unit) to directly provide power to the thrust unit. Moreover, in certain embodiments, the power unit 16 may be in communication with a solar panel or other photovoltaic cell configured to receive and/or convert solar energy into electrical energy for storage within the power unit 16.

Moreover, although discussed herein with reference to an electrical power unit 16, it should be understood that other power units 16, such as a fuel storage unit may be provided in certain embodiments.

In various embodiments, the flying vehicle 10 additionally comprises one or more sensors, such as position sensors (e.g., accelerometer, gyroscopes, magnetometer, altimeters, global positioning systems (GPS), proximity sensors, contact sensors, pressure sensors, and/or the like) for detecting a current position of the flying vehicle 10, sensors and support circuity for determining velocity of the flying vehicle 10, sensors for detecting acceleration of the flying vehicle 10, environmental sensors (e.g., thermal sensors, LIDAR (Light Detection and Ranging) sensors, proximity sensors, contact sensors, pressure sensors, and/or the like), miniaturized sonar and radar, visible and infrared imager and cameras, and/or the like. These sensors may be embodied within a controller housing (described herein), secured relative to a frame 11 of the flying vehicle, and/or the like. Additional sensors may additionally be provided in certain embodiments, such as cameras, microphones, radars, and/or the like, to collect additional information and/or further facilitate guidance of the flying vehicle 10.

As noted herein, the flying vehicle may additionally comprise a controller 18 configured for generating guide signals for the flying vehicle 10 to control operation of the onboard thrust unit and/or one or more additional flying vehicles 10 that may be present. Moreover, the controller 18 may be configured to process signals generated by the one or more onboard sensors discussed above (and/or to utilize signals generated by the one or more onboard sensors when generating guide signals for the thrust unit), to process control commands received from external devices, such as other flying vehicles 10, control devices, and/or the like.

The controller 18 may comprise an onboard computing entity, comprising one or more processors and one or more memory storage devices. In certain embodiments, the one or more memory storage devices may store data indicative of one or more control models, wherein each control model may correspond to a particular level of connectivity of the flying vehicle 10 relative to other flying vehicles. For example, a first control model may be utilized for controlling operation of a flying vehicle 10 while the flying vehicle is operating independently, unconnected to any other flying vehicles. A second control model may be utilized for controlling operation of the flying vehicle 10 while the flying vehicle is attached to one other flying vehicle (thereby implementing a distributed control model with the other flying vehicle for the flying surface 100 embodied by the two connected flying vehicles). A third control model may be utilized for controlling operation of the flying vehicle 10 while the flying vehicle is attached to two other flying vehicles in a first configuration (e.g., the three flying vehicles being connected in a straight line). It should be understood that additional control models may be stored in an onboard memory storage device of a controller 18 of a flying vehicle 10.

As mentioned above, the controller 18 of a single flying vehicle 10 may be configured to implement a portion of a distributed control model for a flying surface 100, collectively with controllers 18 of other flying vehicles within the flying surface 100. Thus, the controller 18 may be configured to communicate with controllers 18 of other flying vehicles to determine appropriate movements to implement desired collective movements and/or manipulations of a flying surface 100. In various embodiments, the controller 18 may be configured for independent determinations of appropriate movements of a corresponding flying vehicle 10 to accomplish a portion of an overall collective movement of a flying surface 100. In other embodiments, the controller 18 may be configured to implement control commands generated by another controller 18 (or other control station) without independent consideration of appropriate control signals for the flying vehicle 10. In yet other embodiments, a controller 18 may be configured to implement a hybrid control system, in which control commands are received by the controller 18 for a particular flying vehicle 10, and the controller 18 is configured to adjust and/or modify the received control commands as necessary to carry out an overall collective movement of a flying surface 100 (or other grouping of a plurality of flying vehicles 10).

In certain embodiments, the controller 18 may be positioned within a controller housing (not shown) secured relative to a frame 11 of the flying vehicle 10. The controller housing may be configured to protect the electronic components of the controller 18. Moreover, although not shown, the controller 18 may additionally comprise a display and/or a user input element configured to provide information to a user and/or to receive user input from a user (e.g., to turn on/off the flying vehicle 10). The display and/or user input element may be accessible from outside of the controller housing in certain embodiments.

In certain embodiments, the controller 18 is in communication with a communication module 19 configured for transmitting and/or receiving data from one or more external sources. In certain embodiments, the communication module 19 is embodied as one or more antennae (e.g., radio-frequency antennae) configured for wireless data receipt and/or transmission with one or more external sources. The communication module 19 may be configured for communicating via any of a variety of wireless communication technologies, such as a Wireless Area Network (WAN) (e.g., Wi-Fi), a Personal Area Network (PAN), Bluetooth, Bluetooth Low Energy (BLE), cellular data transmission protocols, and/or the like. In certain embodiments, the controller 18 may communicate through custom or specialized communication protocols provided specifically for communication with flying vehicles 10 as discussed herein. In other examples, the communication module may be configured for communicating via one or more line-of-sight based communication protocols, such as infrared (IR) communication protocols. Other communication protocols may be utilized in other embodiments, such as acoustic communication protocols and/or the like.

In various embodiments, the communication module 19 is configured for communicating with the communication modules 19 of other connected flying vehicles 10, for example, via data connections integrated within connectors 13 of certain embodiments. In certain embodiments, the controller 18 of a flying vehicle 10 may also communicate with a centralized controller or long range communication unit that may be present within a flying surface 100 or the controller 18 may also communicate with an external command and control unit separate from any flying surface 100 (e.g., a stationary command and control unit).

In certain embodiments, a flying vehicle 10 may have one or more auxiliary features that may provide additional functionality to the flying vehicle 10 or a flying surface 100 incorporating the flying vehicle 10. It should be understood that various flying vehicles 10 may comprise different (or none) of the example auxiliary features. For example, certain flying vehicles 10 may additionally comprise one or more articulating arms (or other manipulation features, such as hooks, resilient pads, and/or the like) for manipulating objects, a basket or other object support mechanism for supporting and/or carrying at least a portion of an object, or a beacon for providing data and/or signals external to the flying vehicle 10 (e.g., a light-based beacon, a sound-based beacon, an infrared-based beacon, and/or the like), a laser beam for illumination and communication. As other examples, a flying vehicle 10 may comprise a repeater for extending the range of one or more signals (e.g., to operate as a temporary cellular network node), a reflector to reflect one or more signals, an auxiliary power unit for providing power to other flying vehicles 10, and/or the like.

Again, it should be understood that different flying vehicles 10 need not be identical. Certain flying vehicles 10 may have a similar overall shape to facilitate interconnection therebetween. Other flying vehicles 10 may have a different overall shape to serve a different overall function. For example, certain flying vehicles 10 may not be configured for interconnection with other flying vehicles 10, but may instead serve as master controllers for a plurality of other flying vehicles 10 (the onboard controllers 18 of those other flying vehicles operating as slave controllers executing control commands transmitted from the master controller onboard a flying vehicle 10). It should be understood that any of a variety of configurations may be utilized in certain embodiments.

Each flying vehicle may also comprise one or several sensor(s) of the same of varying kinds to facilitate the dynamic attachment and detachment process as discussed herein.

Flying Surface

Figure 5:
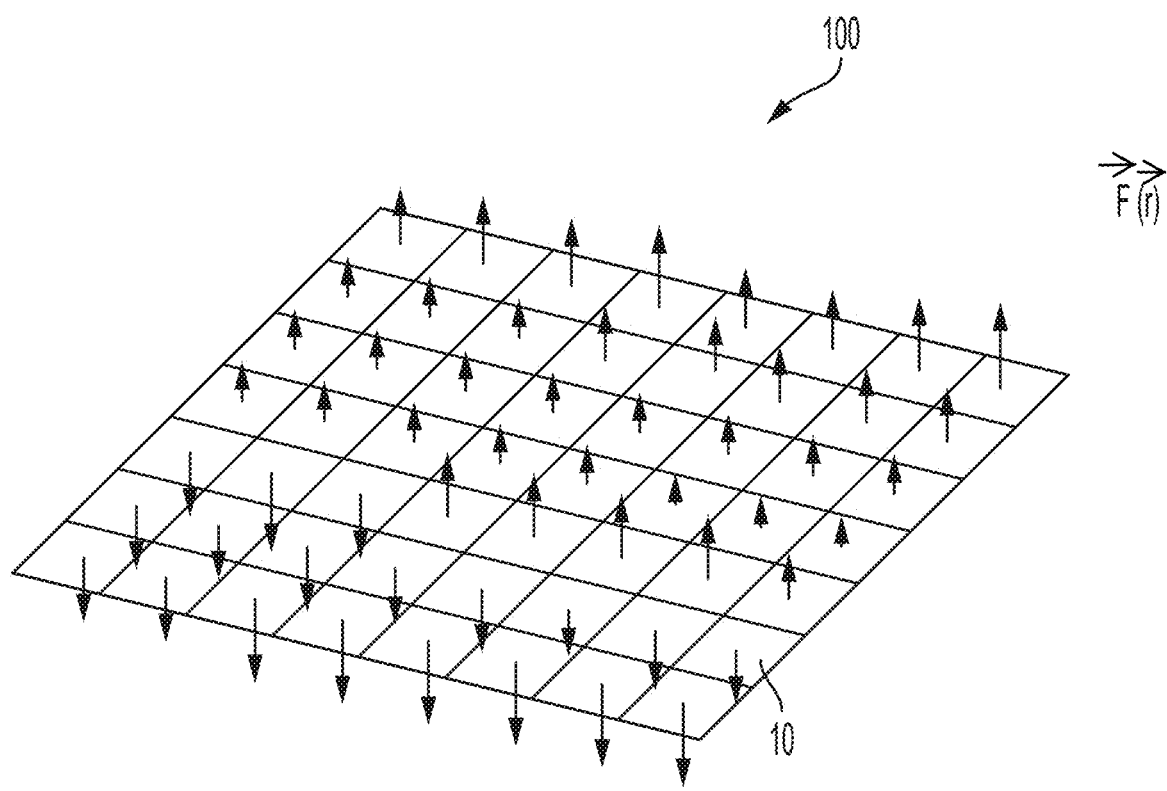
FIGS. 5-6 illustrate thrust vectors possible with rigid and flexible flying surfaces 100, respectively, according to various embodiments.

In certain embodiments, a flying surface 100 may comprise an array of a plurality of flying vehicles 10. The flying vehicles 10 within a flying surface 100 may be secured relative to one another via joints located on sides of each flying vehicle 10, such that the flying vehicles 10 collectively form a single-layer surface (e.g., a planar or non-planar surface having a plurality of bends, curves, corners, and/or the like). The flying vehicles 10 of certain embodiments are configured to individually and independently receive power and/or control information (e.g., wirelessly) and to provide controllable thrust. A flying surface 100 may be rigid (e.g., characterized by rigid joints between flying vehicles 10) flexible (e.g., characterized by flexible joints between flying vehicles 10), a combination of flexible and rigid joints (e.g., characterized by rigid joints between a plurality of flying vehicles 10 and flexible joints between another plurality of flying vehicles 10), or joints having an adjustable rigidity (e.g., characterized by joints that are controllable between a rigid configuration and a flexible configuration, or varying degrees of flexibility). In the case of an at least substantially rigid flying surface 100, the distributed thrust units (the thrust units of individual flying vehicles embodied within the flying surface 100) may be adjusted independently, enabling the performance of a broad range of dynamic maneuvers, movements, and attitude control actions in a very seamless and effective fashion. Furthermore, flying surfaces 100 utilizing a large number of small and independently controllable thrust units is robust in the case of failure of one or more flying vehicles 10, as the non-failing flying vehicles within the same flying surface 100 are capable of supporting the failing flying vehicles 10 during flight. FIG. 5 schematically illustrates a flying surface 100 comprising a plurality of individual flying units 10 secured via rigid joints therebetween.

As discussed herein, the flying vehicles 10 embodying a flying surface 100 of certain embodiments may be independently and individually powered and controlled, and the flying vehicles 10 may be mechanically attached relative to one another. In other embodiments, the flying vehicles 10 may share one or more power sources and/or controllers (e.g., via one or more centralized power sources and/or controllers, or via power sources and controllers located on each flying vehicle 10 that are configured for sharing power and/or processing resources therebetween).

Figure 6:
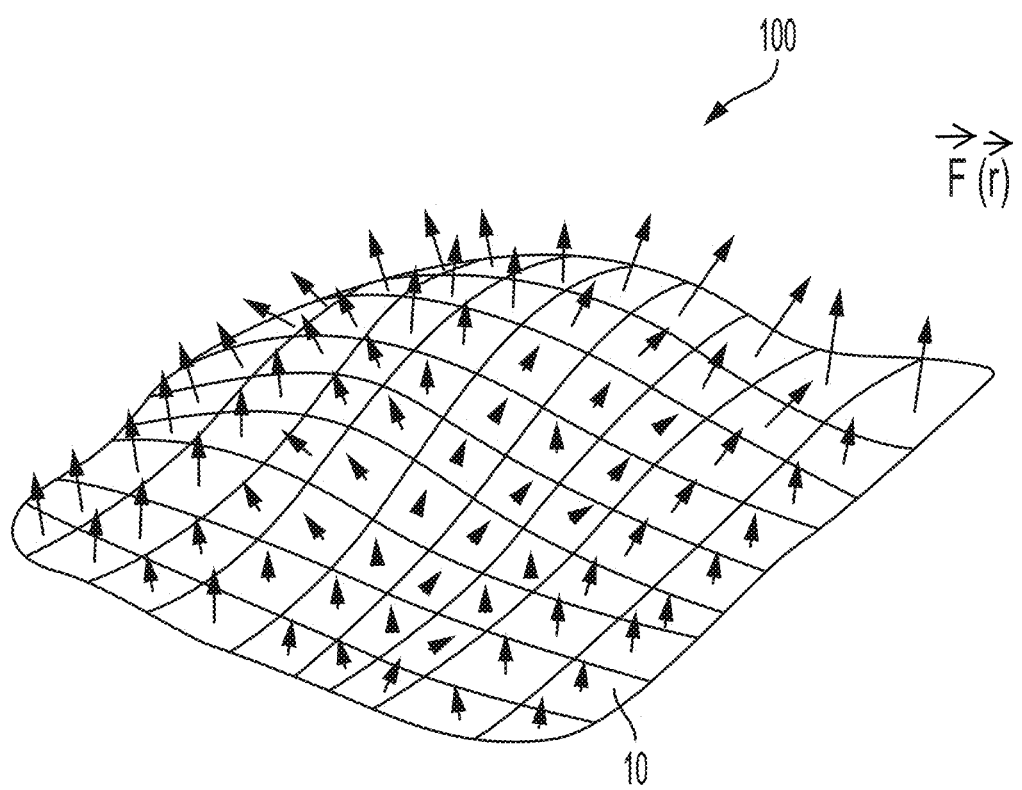

As discussed herein, the mechanical connection between flying vehicles 10 of a flying surface 100 may be rigid in certain embodiments (e.g., as illustrated in FIGS. 2 and 5) or flexible (e.g., via flexible joints or flexible composite materials) (e.g., as illustrated in FIGS. 4 and 6) to enable adjustable conformity and/or dynamically changing of its shape. In certain embodiments, the rigidity of joints between flying vehicles 10 may be dynamically adjusted (e.g., during flight) to perform various flight maneuvers. As an example, one or more joints may be embodied as flexible joints during a first period of time so as to enable the flying surface 100 to self-manipulate in a desired shape (e.g., an aerodynamic shape for linear travel), and the joints may then reconfigure to adjust their rigidity so as to form rigid joints, so that the shape of the flying surface 100 may be locked during a second period of time. Subsequently, the joints may reconfigure into flexible joints, as desired, for manipulating the overall shape of the flying surface 100.

Such active aerodynamics of a flying surface 100 are configured for performing a broad range of functions that would not be otherwise possible by other more rigid and fixed systems. FIG. 6 illustrates a conceptual distribution thrust vector diagram (with the illustrated arrows extending normal to corresponding flying vehicles 10 of the illustrated embodiment representing thrust forces generated by individual flying vehicles 10) for a flexible flying surface 100.

Figure 7:
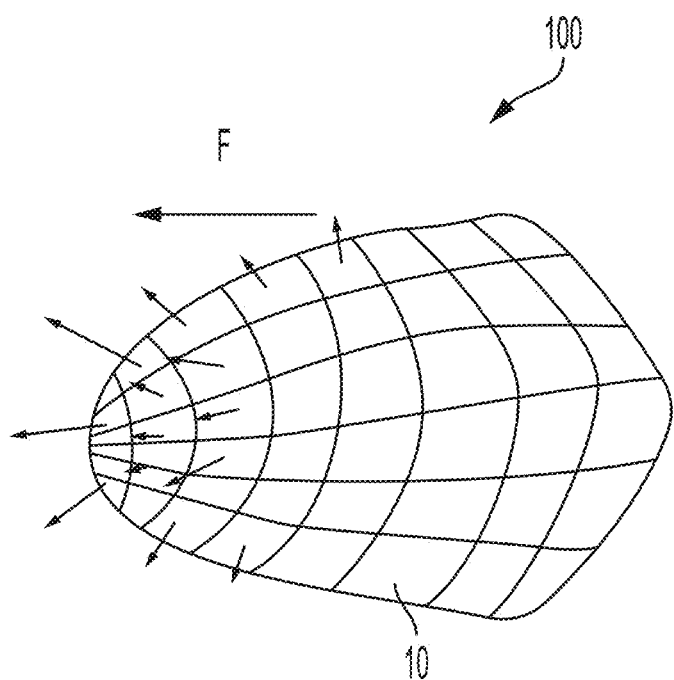
FIGS. 7-8 illustrate example configurations of a flexible flying surface 100 according to various embodiments.
Figure 8:
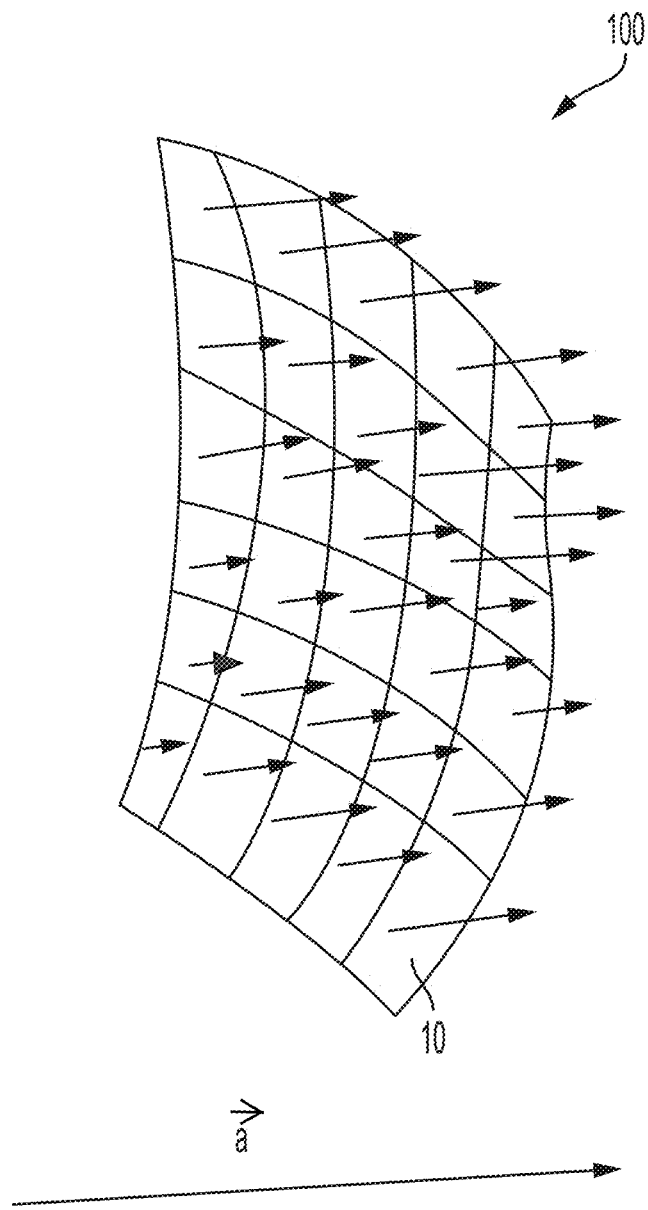

A flexible flying surface 100 (characterized by flexible joints between flying vehicles 10) enables adjustable modes of operation. For example, flying surfaces 100 according to certain embodiments are configured to self-manipulate the shape of the flying surface 100 via the distributed thrust vectors enabled by the individual flying vehicles 10. For example, the flying surface 100 may change between (a) a conical cruising mode as illustrated in FIG. 7 having an aerodynamic conical shape (e.g., to minimize air drag by exposing a minimal surface area of the flying surface 100 to a direction of travel) to facilitate efficient movement of the flying surface 100 (in the direction of the illustrated acceleration vector) and (b) an at least substantially planar or concave shape (e.g., to maximize air drag by exposing a maximum surface area of the flying surface 100 to a direction of travel) referred to as a braking mode as shown in FIG. 8 (wherein the flying surface 100 is traveling in a direction opposite the illustrated acceleration vector, and the flying vehicles 10 are applying thrust in a direction opposite the movement of the flying surface 100 so as to decelerate the flying surface 100).

In other embodiments, the flying surface 100 may be configured to perform other maneuvers, such as maneuvering individual ones of the included flying vehicles 10 so as to perform object manipulation, object grabbing, object holding, object moving, and/or the like. For certain maneuvers, thrust units of individual flying vehicles may be reversed, so as to provide reverse thrust for the flying vehicle 10 (e.g., to provide upward thrust while the flying vehicle 10 is oriented upside down), to move the flying vehicle 10 to a desired position/orientation quickly, to generate a suction pressure against a held object (as discussed herein), and/or the like.

Providing a flexible flying surface 100 (characterized by flexible joints between individual included flying vehicles 10 and/or joints of adjustable rigidity between individual included flying vehicles 10) not only provides a flying surface 100 having high degrees of maneuverability and flexibility, the flexible flying surface 100 also provides substantially similar relationships between theoretical thrust and power consumption. In other words, enabling flexibility of a flying surface 100 comes at no extra performance cost. This relationship is demonstrated in the case of a thrust unit embodied as a motor and propeller, by considering a propeller with a radius r. Total theoretical thrust of the propeller in terms of its power P, is given by:

$$P = k\frac{F^{\frac{3}{2}}}{r}$$

Where P is power (in watts), F is the maximum theoretical thrust (in newtons), and $$k = \frac{1}{\sqrt{2\pi\rho}},$$

where $\rho$ is the density of air. At 1 atm and 20° C., k is approximately 0.36. The maximum theoretical thrust of the propeller in terms of power is hence given by:

$$F = \left(\frac{rP}{k}\right)^{\frac{2}{3}}$$

For a total area of $A_{tot}$ defined by the surface area of an entire array of propellers (e.g., flying vehicles 10 within a flying surface) comprising N total individual propellers, a fill factor of f, and total consumed power of $P_{tot}$ would generate a total theoretical thrust of $F_{tot}$. The corresponding parameters for individual flying vehicles 10 (having corresponding propellers and designated with "FV" subscripts) are therefore:

$A_{tot} = N\, f\, A_{FV} = N\pi r^2$ $F_{tot} = N\, F_{FV}$ $P_{tot} = N\, P_{FV}$ Based on the above, the total thrust force $Ft_{ot}$ of a flying surface 100 is:

$$F_{tot} = N F_{FV} = N\left(\frac{r_{FV} P_{FV}}{k}\right)^{\frac{2}{3}} = \frac{1}{k^{\frac{2}{3}}} N \left(\frac{fA_{tot}}{\pi N}\right)^{\frac{1}{3}} \left(\frac{P_{tot}}{N}\right)^{\frac{2}{3}} = f^{\frac{1}{3}} \left(\frac{r_{tot} P_{tot}}{k}\right)^{\frac{2}{3}}$$

In the interest of clarity, in the above equation, $F_{tot}$ is the total theoretical thrust force of a flying surface 100 having a total surface area $A_{tot}$ (and an effective total radius of $r_{tot}$, which may be back-calculated utilizing the above equations) and having N flying vehicles 10 therein (each flying vehicle 10 generating a total theoretical thrust of $F_{FV}$), based on each flying vehicle 10 including a propeller having a radius $r_{Fv}$, a power input of $P_{FV}$ and the flying surface having a fill factor of f. So, to the first order, the total maximum theoretical thrust does not substantially change, for reasonably high fill-factors.

For example, in one example embodiment, flying surfaces 100 are constructed using an array of flying vehicles 10 each comprising a motor 14, a propeller 15, a power unit 16, and a controller 18 (e.g., wireless control unit). These flying vehicles 10 may be arranged in any of a variety of configurations to form a single-layer flying surface 100, such as those shown in FIGS. 3A-3B and 18A-18H.

In certain embodiments, each flying vehicle 10 independently receives control data (e.g., wirelessly receives control data via RF transmissions, via an antenna embodied within the propeller 15, frame 11, or both) and directly uses the control data to control the motor 14 and propeller 15. The control information may be received wirelessly by each individual flying vehicle 10, thereby eliminating the need for data interconnections between flying vehicles 10 to minimize the weight of the overall flying surface 100, such that the flying surface 100 is light-weight, thereby providing a high degree of agility for the flying surface and a low power requirement for movement and lift thereof.

In certain embodiments, one or more of the flying vehicles 10 may comprise additional functional units, such as cameras, sensors, long-range communication modules, advanced control modules, additional power supply units, object manipulation devices (e.g., actuatable arms, actuatable claws, object hooks, and/or the like), and/or the like. Accordingly, the system enables a highly modular reconfigurable aircraft (flying surface 100) capable of fast reconfiguration for different functions and operations by replacing or reconfiguring certain individual flying vehicles 10 with others having desired functional units.

Although the illustrated embodiments of FIGS. 2-8 and 18A-18H illustrate flying surfaces 100 as being at least substantially gapless, characterized by minimal distance between adjacent flying vehicles 10 (and a maximum fill-factor) based at least in part on the size of joints between adjacent flying vehicles 10, it should be understood that in certain embodiments, a flying surface 100 may have one or more gaps defined therein. As just one example, one or more gaps may have a size and shape at least substantially similar to the size and shape of a flying vehicle 10. The one or more gaps may be surrounded on one or more (e.g., all) sides by additional flying vehicles 10. As yet other examples, a gap may be defined between flying vehicles 10 and may have a size and shape corresponding to natural gaps between adjacent flying vehicles 10 (e.g., due to geometrical limitations preventing adjacent, irregularly-shaped flying vehicles 10 from forming a gapless configuration).

Moreover, although the illustrated embodiments are specifically directed to single-layer flying surfaces 100, it should be understood that in certain embodiments, flying vehicles 10 may be configured to connect relative to one another (e.g., via corresponding connectors) to form multiple layers. In such embodiments, a plurality of single-layer flying surfaces 100 may be secured relative to one another (e.g., at least substantially parallel) so as to provide multi-layer flying shrouds, multi-layer flying planks, and/or the like, as may be desired, for example, to provide additional lift forces for certain configurations. Moreover, as discussed herein, the flying vehicles 10 of a first layer may provide, operate as, or otherwise comprise one or more control surfaces for thrust generated by flying vehicles 10 within a second layer. The flying vehicles 10 within a first layer may be configured to generate thrust through operation of their included thrust units, or at least a portion of the flying vehicles 10 within the first layer may be deactivated, thereby providing passive control surfaces for manipulating air flow generated by the thrust units of flying vehicles 10 within the second layer.

Distributed Control

Control of a flying surface 100 comprising a plurality of individual flying vehicles 10 may be achieved globally (e.g., utilizing a centralized control model) or locally (e.g., utilizing an onboard controller 18). In one embodiment, each flying vehicle 10 (via an onboard controller 18) receives control commands from an external source, such as a centralized command unit 91 or from a remote controlling system (e.g., such control commands may be distributed wirelessly to one or more flying vehicles 10). Moreover, in certain embodiments, the controller 18 (and the individual flying vehicles 10) may be configured to transmit status data regarding the current status of the unit (e.g., flying vehicle 10 and/or external source).

In certain embodiments, the status data generated by the controller 18 of a particular flying vehicle 10 comprises data identifying the flying vehicle 10. For example, identifying data may comprise a unique identifier comprising character string such as a unique alphanumeric string, a symbol, and/or the like. The unique identifier may be stagnant, and may be assigned permanently to a particular flying vehicle 10. In such embodiments, the unique identifier may be painted, printed, molded, or otherwise disposed to be human readable on a surface (e.g., a surface of a frame 11) of the flying vehicle. However, it should be understood that at least a portion of a unique identifier may be dynamically assigned, for example, based at least in part on a position of a flying vehicle 10 within a flying surface. Accordingly, when providing status data to other flying vehicles 10, the identifying data contained within the status data may be indicative of the relative positioning of the flying vehicle 10 within a flying surface.

The status data generated by controllers 18 of individual flying vehicles 10 additionally comprises data indicative of the operating conditions of the flying vehicle 10, such as the amount of power (or fuel) remaining within a power unit, whether the thrust unit is operating properly or operating under an error condition, whether the flying vehicle 10 is interconnected with joints to other flying vehicles 10 and the type of joints utilized for each interconnection, if applicable, which connectors (e.g., identified by connector identifiers corresponding to known positions of the connectors on the flying vehicle 10) are engaged within joints to other flying vehicles 10 and what joint type (e.g., rigid, flexible, dynamic, and/or the like) corresponds to each connector, and/or the like. In certain embodiments, the status data may additionally comprise data indicative of one or more sensor outputs from sensors onboard the flying vehicle 10, including, for example, altitude data, GPS-positioning data, proximity sensor data, LIDAR sensor data, temperature sensor data, velocity data, acceleration data, rate of rotation (for example, obtained from a MEMS gyroscope) and/or the like.

In certain embodiments, the status data may comprise data indicative of a connectivity state of a particular flying vehicle 10. The connectivity state of a flying vehicle 10 identifies whether the flying vehicle 10 is connected with other flying vehicles 10, which connectors are incorporated into joints with interconnected other flying vehicles 10 (e.g., identified by joint identifiers), a quantity of interconnected other flying vehicles 10 connected with the particular flying vehicle 10. In certain embodiments, the status data for a particular flying vehicle 10 within a flying surface may additionally comprise data indicating the total quantity of flying vehicles 10 included within the flying surface.

As discussed herein, each flying vehicle 10 encompasses a corresponding controller 18 for generating control signals for the corresponding flying vehicle 10 alone. The controller of a flying vehicle 10 may be configured to receive data from an external control system indicating an overall movement pattern of the corresponding flying surface 100, without individual control signals specific to a particular flying vehicle 10. In such embodiments, the controller 18 of each flying vehicle 10 may be configured to self-determine its own location within a flying surface 100, so as to enable a determination of necessary movements of the flying vehicle 10 to satisfy the overall movement pattern of the corresponding flying surface 100. In certain embodiments, a controller 18 of a flying vehicle 10 may self-determine its own location within a flying surface 100 via any of a variety of methodologies. As just one example, each controller 18 may be configured for wired or wireless communication with other flying vehicles 10, so as to determine whether and/or how many other flying vehicles 10 are attached directly to a particular flying vehicle 10. The controllers 18 of each flying vehicle 10 may communicate therebetween and may share data indicative of the number and/or location of flying vehicles 10 attached directly thereto. Based at least in part on determinations made by each flying vehicle 10 of the number and/or locations of flying vehicles 10 attached thereto, each controller 18 may determine its own location within a flying surface 100. As another non-limiting example, each controller may be configured to receive input identifying its location within a flying surface 100. In other embodiments, the controller 18 may be configured to utilize the status data stored locally thereon, and/or the status data of other flying vehicles 10 to self-determine its position within the flying surface 100.

It should be understood that the physics of movement of a flying vehicle 10 varies depending on its location within a flying surface 100, and therefore the flight behavior of the flying surface 100 varies based on the size and shape of the flying surface 100 (based on the quantity and location of flying vehicles 10 within the flying surface 100) and the type of joints (e.g., flexible, rigid, and/or the like) between flying vehicles 10 of the flying surface 100. Accordingly, upon a controller of a particular flying vehicle 10 determining its own location within a flying surface 100, the controller may be configured to identify a relevant control model so as to enable appropriate movements by the flying vehicle 10 to satisfy an overall movement pattern of the corresponding flying surface 100. As an illustrating example, providing thrust normal to a flying vehicle 10 located centrally within a large flying surface 100 (such that the flying vehicle 10 is surrounded by multiple rows of additional flying vehicles 10 on all sides) will likely result in the flying vehicle 10 moving in the direction of the provided thrust, however the movement of the flying vehicle 10 will be affected by thrust provided by flying vehicles 10 surrounding the flying vehicle 10 in question. By contrast, a flying vehicle 10 attached on only one side to a series of other flying vehicles 10 by a flexible joint will be characterized by other control behavior by a thrust generated normal to the flying vehicle 10. Rather than moving in a linear direction at least substantially parallel to the generated thrust, the thrust generated creates a moment about the joint, causing the flying vehicle 10 to move in an angular direction about the joint (assuming the connected flying vehicles 10 do not have parallel and equal thrust outputs).

Accordingly, to implement an overall movement pattern of a flying surface 100, each flying vehicle 10 may be configured to compare its current location, orientation, angle, and/or the like (e.g., determined via one or more onboard sensors) relative to a target position of the flying vehicle 10, as determined by the overall movement pattern. Upon determining that one or more positional adjustments are necessary to achieve the overall movement pattern, the controller 18 provides control signals to the onboard thrust unit based on a control model implemented in accordance with determined physics of movement of the flying vehicle 10 within the flying surface 100 to move the flying vehicle 10 toward a desired position. The controller 18 may utilize a control loop to detect as the flying vehicle 10 is moving toward the desired position to make necessary adjustments to the control signals provided to the onboard thrust unit to achieve the desired positioning of the flying vehicle 10. The control loop (e.g., detecting the current positioning of a flying vehicle 10 and comparing the detected position relative to a desired position) enables individual flying vehicles 10 to accommodate disabled flying vehicles 10 within the flying surface 100 by adjusting the amount of thrust generated by a thrust unit of an individual flying vehicle and/or variations in control surface (if present) 10 upon a determination that additional thrust is required to move the flying vehicle 10 to a desired position (e.g., as a result of a disabled flying vehicle 10 within the flying surface 100 failing to aid in movement of the flying surface 100).

As discussed herein, an overall movement pattern of a flying surface 100 may encompass any of a plurality of movements and may be dependent at least in part on whether included joints between flying vehicles 10 are rigid or flexible. As discussed in the below example use cases, an overall movement pattern may enable a flying surface 100 to grasp and/or manipulate objects (e.g., between flying vehicles 10), to self-configure the shape of the flying surface 100 to facilitate movement through the air, and/or the like. In each of the described overall movement patterns, individual flying vehicles 10 are configured to self-determine appropriate movements for the individual flying vehicles 10 so as to implement the overall movement pattern of the flying surface 100.

Moreover, the distributed control methodology may be configured to enable one or more controllers 18 of flying vehicles 10 within a flying surface 100 to depower (e.g., power off, enter a stand-by mode, or otherwise cause the onboard thrust unit to discontinue generating thrust) upon a determination that a depowered operation is necessary to achieve a control pattern of the overall flying surface 100.

Additionally, although the controller 18 is described above as embodied as a single controller-device, it should be understood that a controller 18 in accordance with certain embodiments may comprise a plurality interacting controllers 18 (e.g., of one or more flying vehicles 10), where the overall behavior of the flying surface 100 is controlled through the aggregate overall behavior of the controllers 18 and their interactions.

Centralized Control

In other embodiments, the flying vehicles 10 of a flying surface 100 may be controlled in accordance with a centralized control configuration, such that controllers of individual flying vehicles 10 receive direct control instructions from a centralized controller that may be conveyed directly to an onboard thrust unit. Thus, rather than individual controllers having to make determinations of how the flying surface 100 will react to particular control signals provided to the onboard thrust unit, a centralized control system makes determinations of appropriate control signals to be provided to onboard thrust units.

As a specific example, at least a portion of the controllers 18 of flying vehicles 10 within a flying surface 100 become configured as slave controllers to one or more master controllers. In certain embodiments, a master controller may be embodied as one of the controllers of a particular flying vehicle 10 within a flying surface 100. In other embodiments, the master controller may be embodied as a control unit located external to the flying surface 100, such as on a different flying device (e.g., not physically connected to flying vehicles 10 within the flying surface 100), on a stationary device (e.g., located on the ground), and/or the like. As just one example, a centralized control unit may be embodied as a base station or communication hub specifically configured for operation with one or more flying vehicles 10 (e.g., comprising appropriate communication transmitters/receivers so as to transmit and/or receive signals to/from a plurality of flying vehicles 10). In certain embodiments, such a base station or communication hub may be configured for transmitting a plurality of signals, for example, to be received by a plurality of flying vehicles 10 (e.g., utilizing different transmission frequencies, time-division communication signals, frequency-division communication signals, and/or the like). In certain embodiments, a single communication signal transmitted from a base station or communication hub may be provided for receipt by a plurality of flying vehicles 10, and the communication signal may comprise flying vehicle-specific data segments (e.g., delimited portions of data) applicable for each of a plurality of flying vehicles 10. In such embodiments, the controller 18 of each flying vehicle may be configured to identify applicable portions of the transmission (e.g., based on unique identifiers included within the data transmission) so as to carry out appropriate control commands as indicated within the data transmission.

In such embodiments, the master controller is configured to transmit signals to one or more slave controllers within the flying surface 100, specifically instructing those slave controllers how to interact with thrust units onboard the individual flying vehicles 10. In certain embodiments, signals transmitted from the master controller may be transmitted together with a unique identifier corresponding to a particular slave controller. The unique identifier may be utilized by each slave controller to determine whether associated signals are applicable to a particular slave controller. In use, a particular slave controller receives signals from the master controller and determines which (if any) received signals are applicable to the slave controller based at least in part on comparing a unique identifier received with the signals against a unique identifier stored locally at the slave controller. Upon identifying one or more signals applicable to the particular slave controller, the slave controller provides control signals to the onboard thrust unit in accordance with the received signals, so as to implement the signals received. Each of a plurality of controllers corresponding to individual flying vehicles 10 within the flying surface 100 separately implement signals designated by specific unique identifiers, and collectively the flying vehicles 10 implement an overall movement pattern of the flying surface 100.

Moreover, slave controllers may be configured to transmit status data to the master controller, thereby enabling the master controller to accommodate disabled and/or malfunctioning flying vehicles 10. For example, upon a master controller determining that one or more flying vehicles 10 are malfunctioning (e.g., based on a failure to receive status data from a flying vehicle 10 at a designated time), the master controller may be configured to adjust control signals to be provided to other, functional flying vehicles 10 to accommodate the determined disabled flying vehicle 10. In other embodiments, the status data provided by a flying vehicle 10 may further comprise positional data and/or dynamic operational information (e.g. attitude, airspeed, thruster instantaneous power, and/or the like), thereby enabling the master controller to implement a control loop similar to that discussed above in reference to the decentralized control. For example, the master controller may be configured to determine, based at least in part on status data received from the individual flying vehicles 10, whether a flying vehicle 10 is in a desired position, and to provide control signals to the flying vehicle 10 to cause the flying vehicle 10 to move toward a desired position.

Moreover, the centralized control configuration enables individual flying vehicles 10 to be disabled or otherwise depowered in order to accommodate desired positioning of various flying vehicles 10 within a flying surface 100.

It should be understood that certain embodiments may utilize a hybrid control configuration, encompassing both distributed and centralized control features. For example, overall control behaviors, maneuvers, and/or the like, applicable to a flying surface 100, a swarm of flying vehicles 10, and/or the like, may be generated at a centralized controller, and command signals may be provided to a plurality of controllers 18 of individual flying vehicles 10 in accordance with the centralized control aspects. Those individual flying vehicles 10 may be configured to adjust or otherwise modify the command signals upon receipt, for example, to accommodate characteristics of the environment surrounding the flying vehicle 10, to accommodate current performance of the flying vehicle 10 (e.g., underpowered thrust unit, differences between theoretical and actual movements based on joints with other flying vehicles 10, and/or the like). Other embodiments may utilize a hybrid control configuration so as to accommodate differences in flying vehicles 10, to accommodate differences in control configurations of multiple flying surfaces 100, and/or the like.

Wireless Power Transmission

Figure 9:
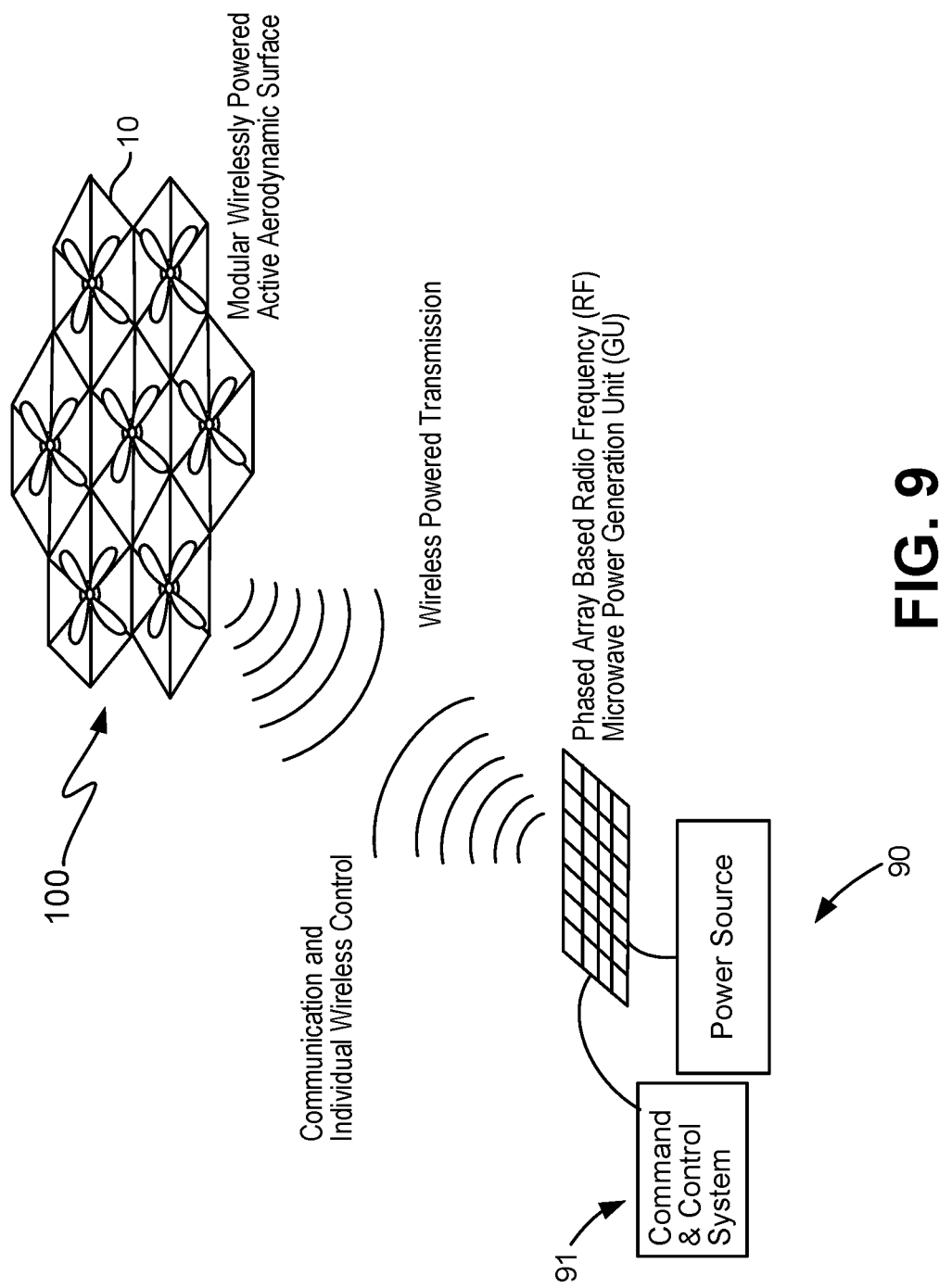
FIG. 9 schematically illustrates transmission of wireless power and wireless control signals to a flying surface 100 according to one embodiment.

In certain embodiments, flying vehicles 10 and/or flying surfaces 100 are configured for wireless power transmission, for example, as illustrated in FIG. 9. The resulting flying surface 100 may be characterized by a light weight, highly versatile active aerodynamic surface, for example, as shown in FIG. 9.

As just one example, a flying surface 100 may comprise a plurality of flying vehicles 10 each comprising a motor 14 and propeller 15 (or other thrust unit), a wireless power recovery unit, and a wireless control unit (e.g., controller 18). The flying vehicles 10 may be arranged in various configurations, such as those discussed herein.

As shown in FIG. 9, each flying vehicle 10 of certain embodiments independently receives wireless power (e.g., via RF power transmissions from a power generation unit) and control information (e.g., via wireless data transmission protocols). The wireless power and/or the control information may be received at each flying vehicle 10 via one or more antennae implemented on/within the frame 11, the propeller 15, and/or the like and directly utilizes the received power to power a thrust unit. Moreover, the control information may be received wirelessly at each flying unit 10, for example, from a centralized command unit 91 as shown in FIG. 9. In such embodiments, the flying surface 100 need not have any interconnectivity between flying vehicles 10, making the flying surface 100 extremely lightweight and versatile.

The control behavior of the flying surface 100 may be executed globally (e.g., via a centralized control unit) or locally (e.g., via controllers local on each flying vehicle 10), or in a hybrid arrangement where certain decision and commands are issued globally and certain other commands are performed locally. In certain embodiments, each flying vehicle 10 receives control commands from either a centralized command unit in the flying vehicle (or external to the flying vehicle) or wirelessly from a centralized command unit 91, and in various embodiments the flying vehicles 10 may be configured to transmit pertinent measurement information about the status of the flying vehicle 10.

In certain embodiments, each flying unit is configured to receive and/or recover RF and/or microwave power transmissions from a remote power unit 90. This power recovery may be executed via one or more mechanisms. For example, the frame 11 of the flying vehicle 10 may comprise antennae and/or rectification units to convert the received energy to DC power to drive an onboard motor 14 of a thrust module, for example, as shown in FIG. 1A. As another example, the recovery antennae and/or rectification units may be integrated as a part of a propeller 15 (as shown in FIG. 1B) and may be configured to directly feed the motors via integrated rectifiers 10 of the flying vehicle 10.

With reference to FIG. 9, the remote power unit 90 may comprise and/or may be in communication with a power source, such as a power grid, a solar power system, a power storage system (e.g., one or more batteries), and/or the like. The remote power unit 90 may additionally comprise a transmitter, such as a phased array transmitter configured for radio frequency (RF) and/or microwave power transmission.

In certain embodiments, the remote power unit 90 and the centralized command unit 91 may utilize a shared transmitter (e.g., a shared transmission array system). In other embodiments however, the remote power unit 90 and centralized command unit 91 may utilize separate transmitters, for example, operating at different frequencies, on different time divisions, and/or the like. In certain embodiments, the power signals and/or control signals may be received at individual flying vehicles 10 via shared antennae or via separate antennae (e.g., a first antenna is configured for receipt of power signal receipt and a second antenna is configured for control signal receipt).

As discussed herein, the flying vehicles 10 may comprise an onboard power unit, such as a power storage unit (e.g., one or more batteries). Accordingly, each flying vehicle 10 may be configured to receive power transmissions from a power generation unit 90, for example, while the flying vehicles 10 are within range of the power generation unit 90, and to store power within an onboard power unit, thereby enabling the flying vehicles 10 to operate outside of transmission ranges of the power generation unit 90. Although the illustrated embodiment of FIG. 9 shows the power generation unit 90 as stationary, it should be understood that in certain embodiments, the power generation unit 90 may be within, on, or otherwise associated with another flying vehicle, a moving ground-based or water-based vehicle and/or the like, so as to provide a movable power generation unit 90 configured to provide power to one or more flying vehicles 10 (e.g., within a flying surface 100) mid-flight of the flying vehicles 10.

Flying Surface Operation

As discussed herein, the control behavior of the flying surface 100 may be achieved via global control (e.g., via a centralized controller) or distributed local control (e.g., via control performed at individual flying vehicles 10) and may be based at least in part on predicted flight behaviors of the flying vehicle. As discussed herein, each flying vehicle 10 receives control commands from a centralized command unit 91 within the flying surface 100 or wirelessly from a centralized command unit 91 external to the flying surface 100. In certain embodiments, each flying vehicle 10 transmits pertinent measurement information (e.g., generated by onboard sensors), which may be a part of status data, to a command unit, remote controlling system, and/or the like. In other embodiments, also as discussed herein, each flying vehicle 10 operates independently to generate its own control signals so as to implement an overall movement pattern of the flying surface 100.

In certain embodiments, the flying surface 100 is characterized by rigid joints between connected flying vehicles 10 included therein. In such embodiments, the flying surface 100 operates as a rigid flying surface 100 maneuverable as a rigid body.

In other embodiments, the flying surface 100 is characterized by flexible joints between some or all of the connected flying vehicles 10 included therein. In such embodiments, the flying surface 100 operates as a flexible flying surface 100 in which individual flying vehicles 10 are movable relative to adjacent and connected flying vehicles 10, and accordingly the overall flying surface 100 is maneuverable through individual movements of specific flying vehicles 10 connected in a flexible manner.

In yet other embodiments, the flying surface 100 is characterized by dynamically reconfigurable joints having configurable rigidity. In such embodiments, control of the flying surface 100 may encompass changing the rigidity of one or more joints (e.g., to selectably lock the flying surface 100 in a desired configuration, and to subsequently unlock the flying surface 100 so as to change the shape of the flying surface 100).

In certain embodiments, flying vehicles 10 may have aerodynamically efficient flight behaviors within a flying surface 100 by collectively providing sufficient thrust for the flying surface 100 to sustain the flying surface 100 in flight. FIGS. 10-16 show various examples of the simulated airflow obtained using computational fluid dynamics for a flying surface 100 having 6 individually powered flying vehicles 10. The flying surface 100 may be stabilized with a dynamic control system which utilizes the core concept of active aerodynamic surface. Moreover, although the illustrated examples show all airflow in a single direction through multiple flying vehicles 10, it should be understood that the thrust units of flying vehicles 10 may be reversible as discussed herein (e.g., a motor configured to reverse the direction of rotation of a propeller), so as to change the movement direction of a particular flying vehicle 10, for example, to perform certain aerial maneuvers.

Figure 10:
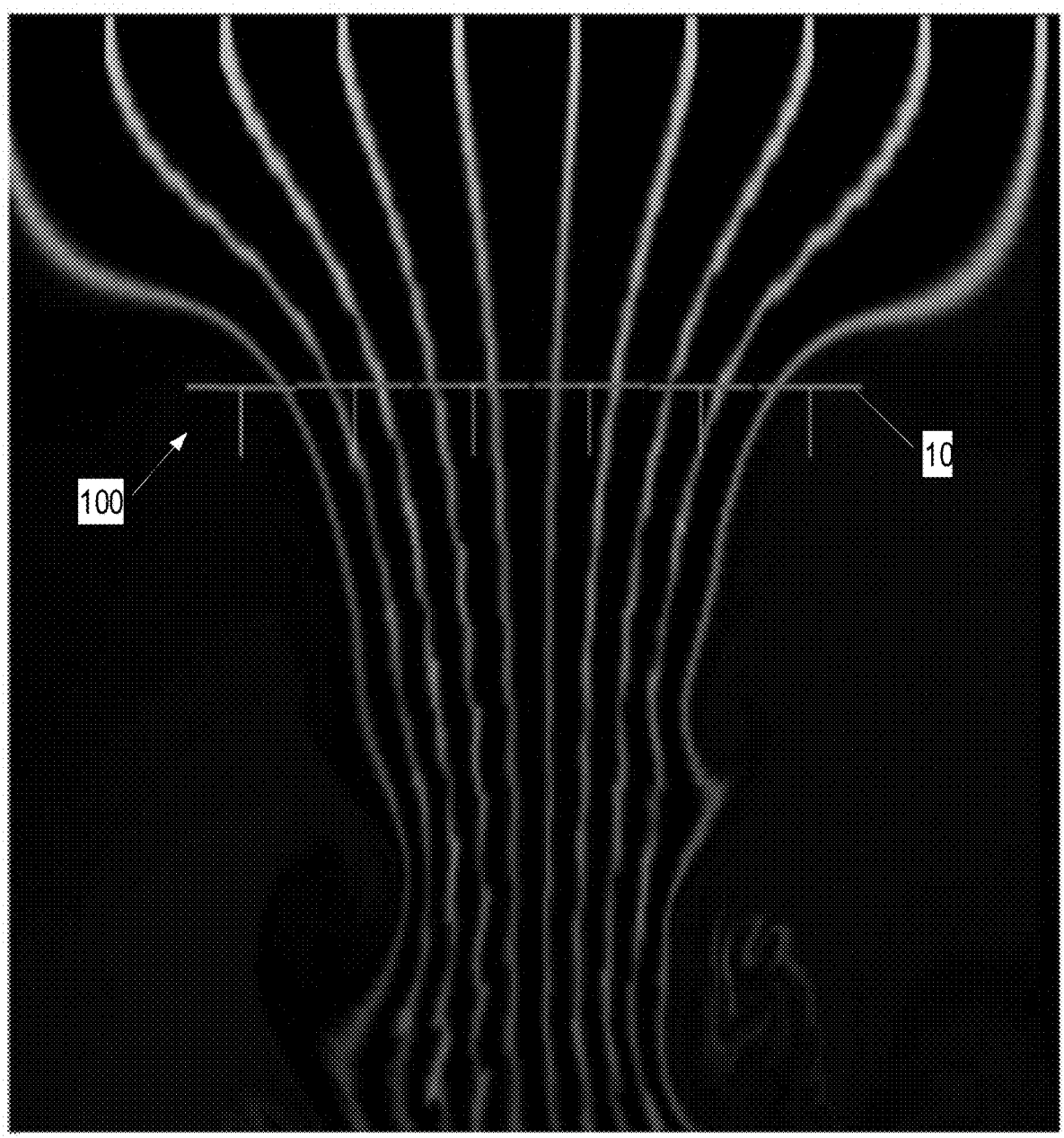
FIGS. 10-16 illustrate air flow diagrams demonstrating air flow through flying surfaces 100 in various orientations according to certain embodiments.
Figure 11:
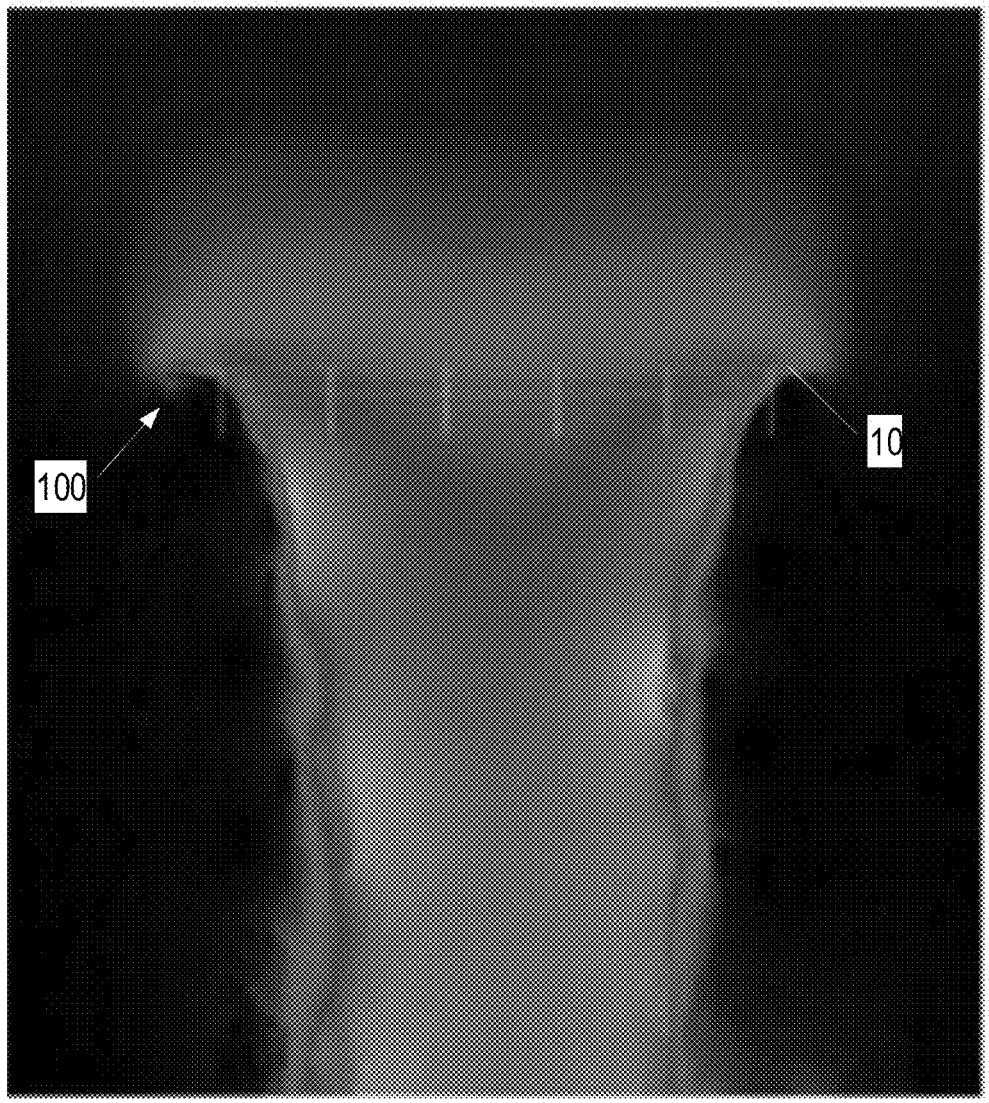

FIGS. 10-11 illustrate simulated airflow of a rigid flying surface 100 having 6 individually powered flying vehicles 10 each generating equal thrust and characterized by rigid joints between individual flying vehicles 10. The simulated airflow of the rigid flying surface 100 shown in FIGS. 10-11 illustrates a first flight behavior of a flying surface 100, which may be implemented via distributed or centralized control of the included flying vehicles 10.

Figure 12:
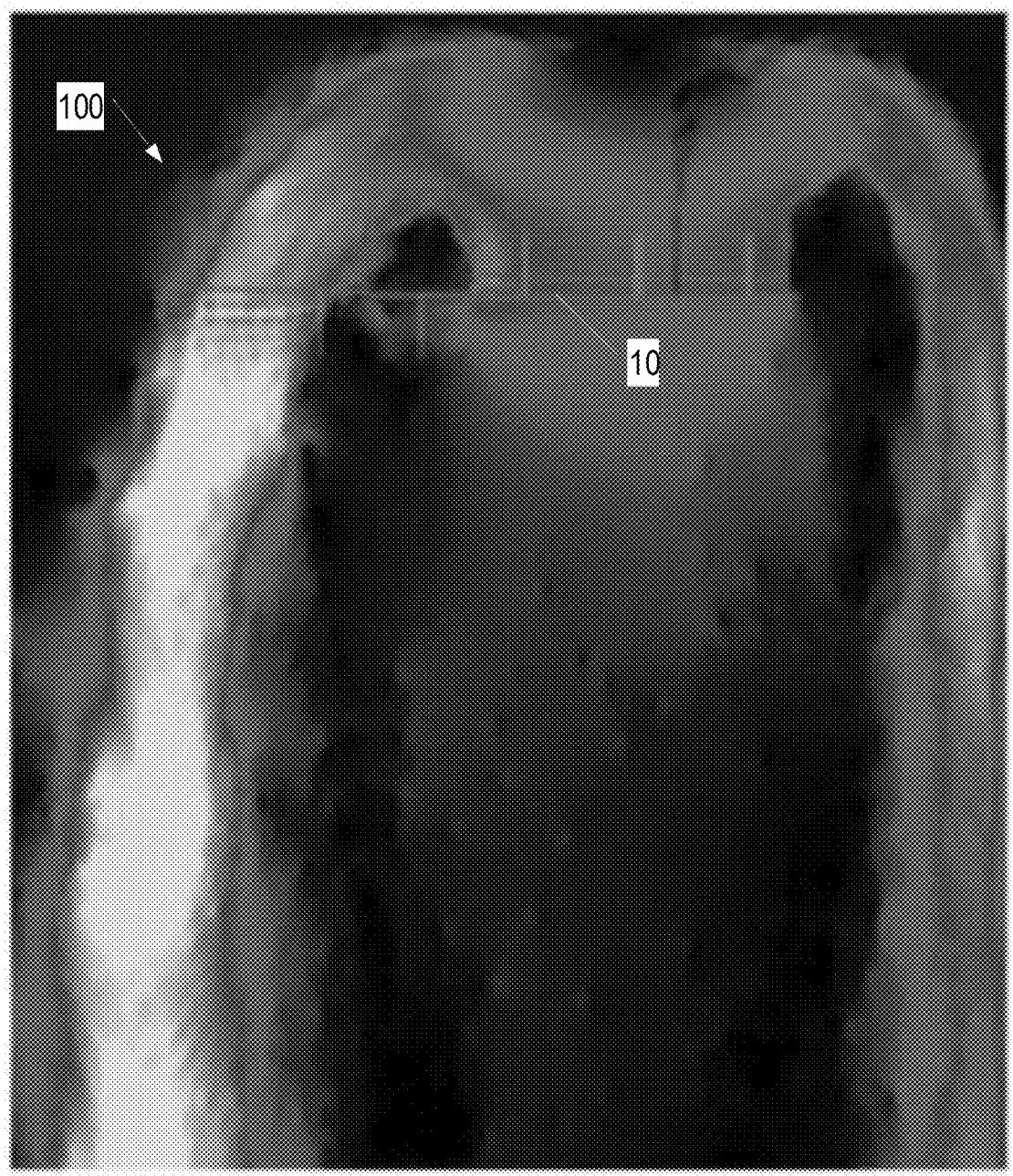

FIG. 12 illustrates simulated airflow of a rigid flying surface 100 having 6 individually powered flying vehicles 10, wherein 3 flying vehicles on the illustrated left side of the figure area generating downward facing thrust, and 3 flying vehicles on the illustrated right side of the figure are generating equal amounts of upward facing thrust, thereby generating torque for movement of the flying surface 100. FIG. 12 illustrates another flight behavior of a flying surface 100, which may be implemented via distributed or centralized control of the included flying vehicles 10.

Figure 13:
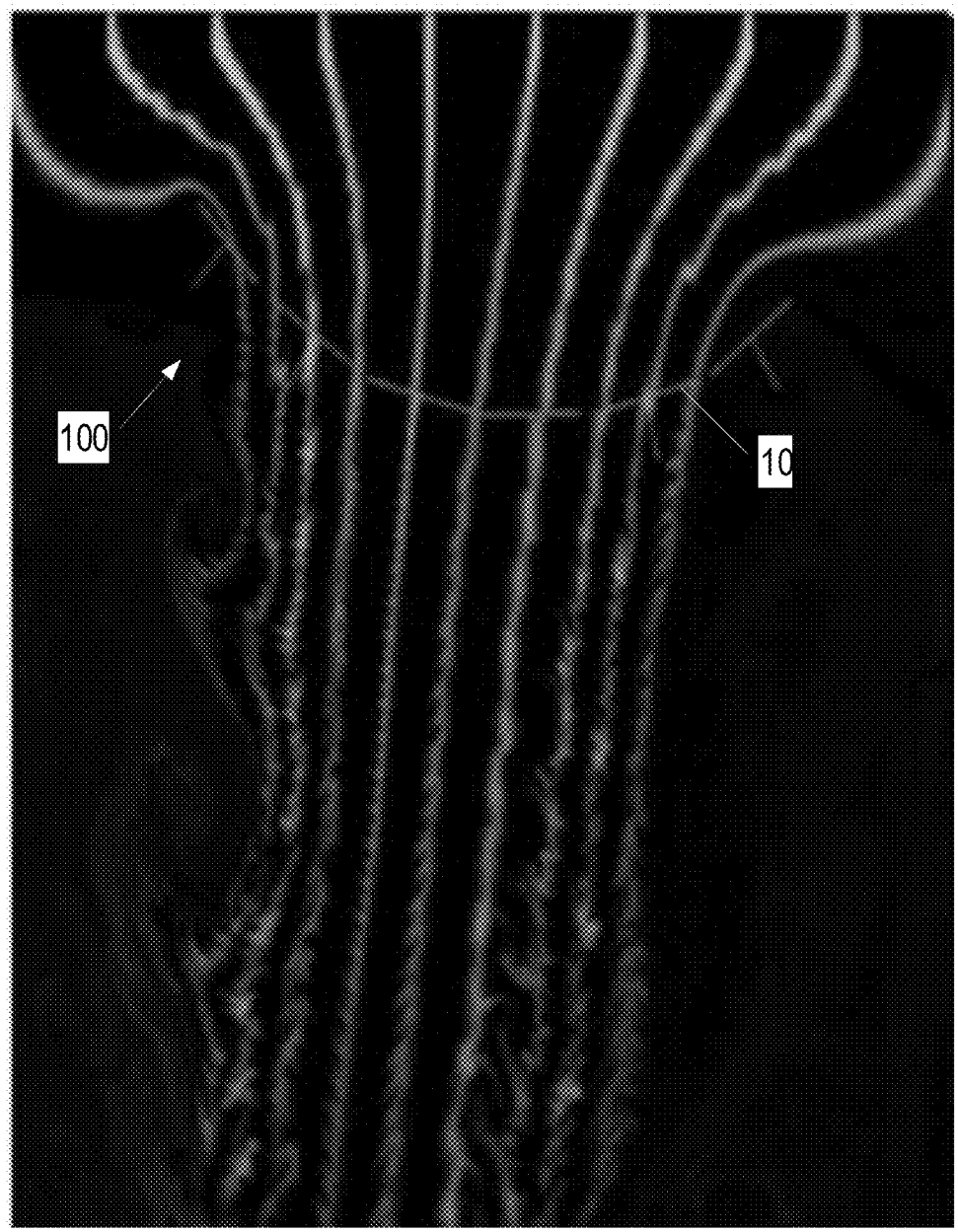
Figure 14:
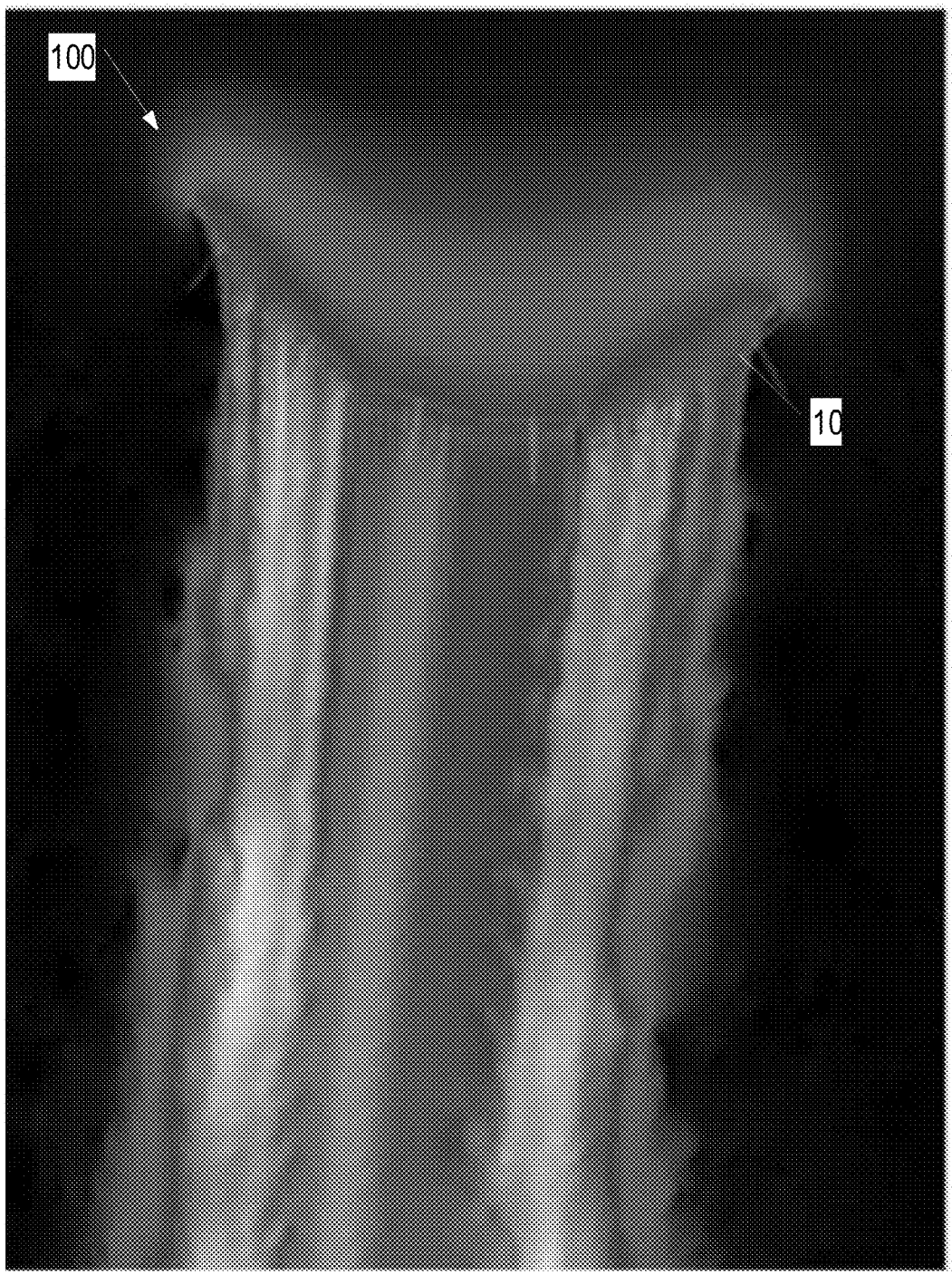

FIGS. 13-14 illustrate simulated airflow of a flexible flying surface 100 having 6 individually powered flying vehicles 10 arranged in a concave configuration, such that thrust generated by each of the individually powered flying vehicles 10 is directed normal to the corresponding flying vehicle 10 and outward from the concave shape of the flying surface 100. As shown, providing thrust from the flying vehicles 10 in the illustrated configuration may be utilized to move a flying surface 100 in a linear direction. FIGS. 13-14 illustrates yet another flight behavior of a flying surface 100, which may be implemented via distributed or centralized control of the included flying vehicles 10.

Figure 15:
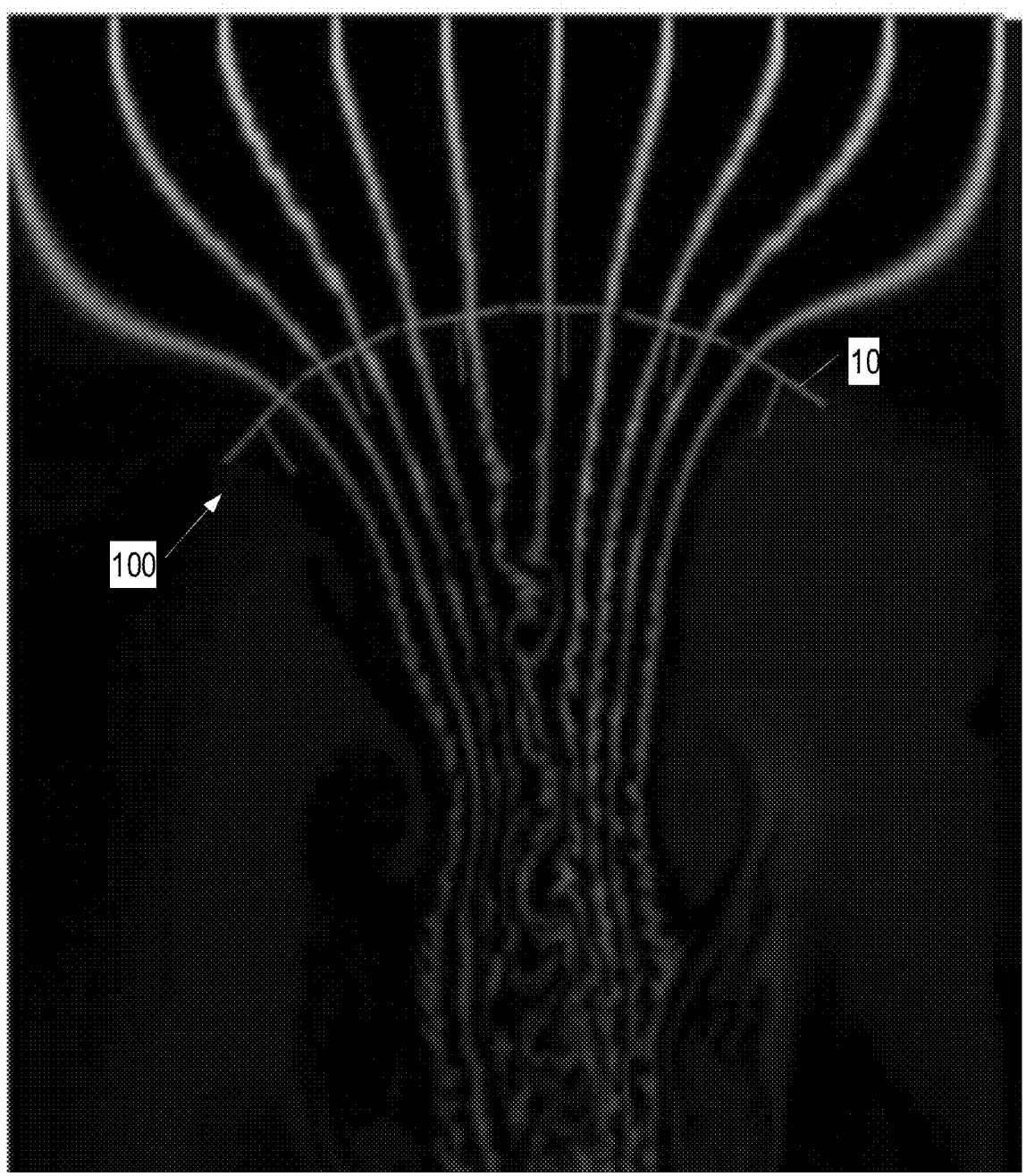
Figure 16:
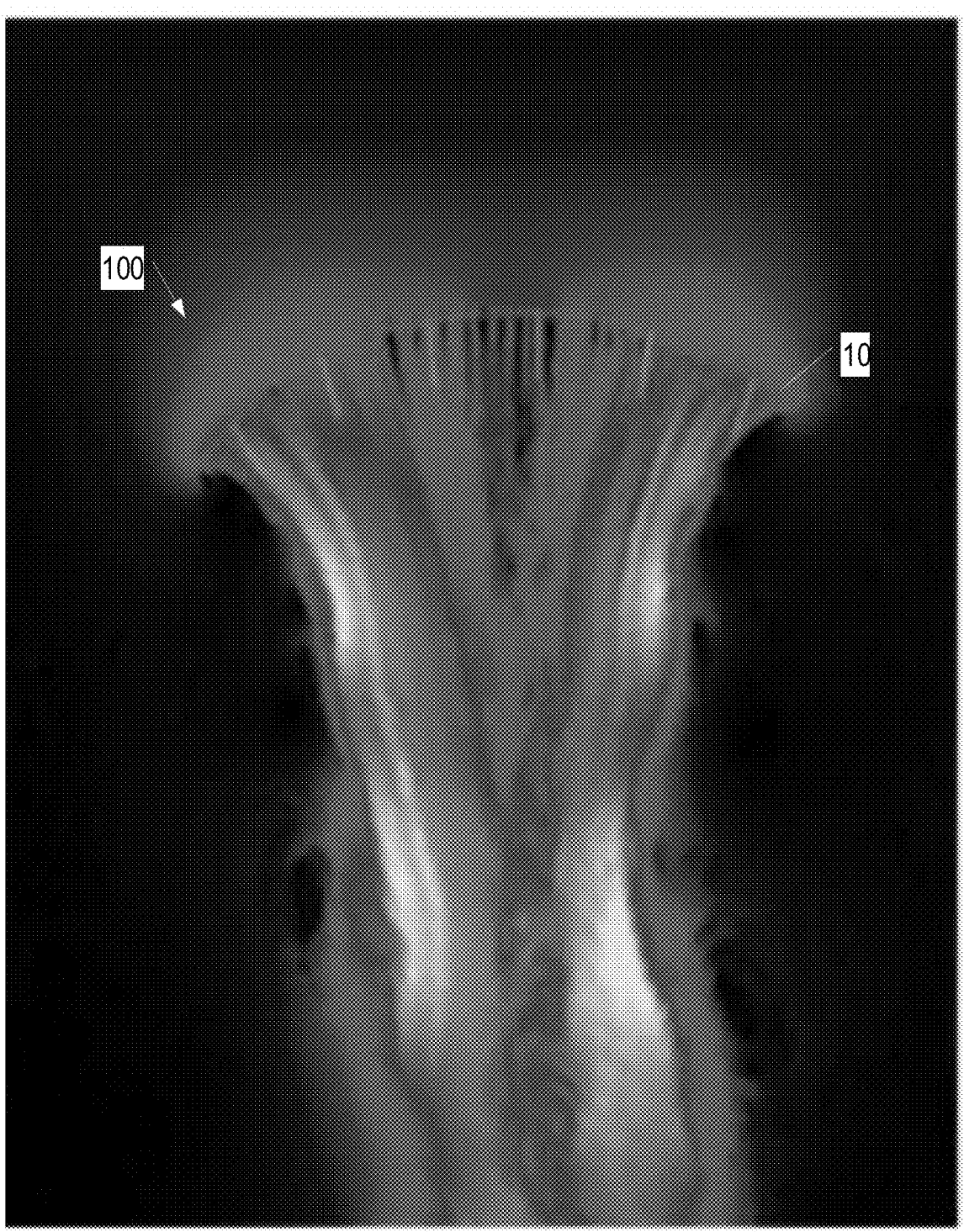

FIGS. 15-16 illustrate simulated airflow of a flexible flying surface 100 having 6 individually powered flying vehicles 10 arranged in a convex configuration, such that thrust generated by each of the individually powered flying vehicles 10 is directed normal to the corresponding flying vehicle 10 and inward from the convex shape of the flying surface 100. As shown, providing thrust from the flying vehicles 10 in the illustrated configuration may be utilized to move a flying surface 100 in a linear direction. FIGS. 15-16 illustrates another flight behavior of a flying surface 100, which may be implemented via distributed or centralized control of the included flying vehicles 10.

As discussed herein, the controllers 18 of individual flying vehicles included within a flying surface 100 may be configured to determine a predicted flight behavior of the overall flying surface 100 when generating control signals for controlling onboard thrust units. Depending on the use of a particular flying surface (e.g., as discussed herein), the controllers 18 may be configured to generate appropriate control signals to implement a desired operation of the overall flying surface 100, considering the predicted flight behavior of the overall flying surface 100. As just one example, upon determining that one flying vehicle 10 within a flying surface 100 comprises a camera, the controllers 18 of the flying vehicles 10 may be configured to generate control signals that cause the overall flying surface 100 for stable repositioning of the camera, such that the camera remains substantially stable (with minimal oscillation) during movements of the flying surface 100.

Dynamic Reconfiguration of a Flying Surface

The operation of a flying surface 100 may be selectably reduced to a swarm of individual flying vehicles 10 (or smaller flying surfaces 100 comprising a small plurality of flying vehicles 10), reconfigured dynamically in-flight, and/or to dispatch certain portions of the flying surface 100 (e.g., a subset of the flying vehicles 10 of the flying surface 100) to perform certain tasks and/or to reattach and reconfigure in flight provides significant advantages over traditional aircraft. As yet other examples, flying vehicles 10 of a first flying surface 100 may be configured to detach mid-flight, to travel to a second flying surface 100, and attach to the second flying surface 100 mid-flight.

A dynamically reconfigurable, flying surface 100 configured to detach and attach during flight (e.g., portions of the flying surface 100, such as individual flying vehicles 10) and to reconfigure and reorganize provides a broad range of applications. In various embodiments, individual flying vehicles 10 of the flying surface 100 may be configured to detach and/or reattach in the same or a different configuration in-flight (e.g., to change the configuration of the flying surface 100 in-flight). For example, various embodiments are configured to change the overall behavior of the flying surface 100 by rearranging connected flying vehicles, to operate as a swarm of smaller flying surfaces 100 and/or a swarm of flying vehicles 10, to capture a failing or faulty flying vehicle 10, to dispatch a subset of flying vehicles 10 to perform a task, and/or the like.

Flying vehicles 10 in accordance with various embodiments are configured to mechanically detach and/or attach relative to one another in-flight, thereby enabling in-flight mechanical reconfiguration of the flying surface 100 under power of the thrust units of individual flying vehicles 10 (controlled by respective controllers 18 of the flying vehicles 10) and/or based on signals generated by one or more onboard sensors of individual flying surfaces 10 (e.g., proximity sensors, contact sensors, location sensors, and/or the like). In such embodiments, at least a subset of the flying vehicles 10 forming the flying surface 100 are configured to mechanically separate from the main structure of the flying surface 100, to fly independently and/or in a swarm configuration, and/or to be able to reattach and reconfigure relative to one another to form a larger flying surface 100 that may operate as a singular aircraft. As discussed herein, individual flying vehicles 10 may be configured for distributed control configurations, in which controllers of each of the individual flying vehicles 10 operate independently to self-control movements (e.g., based at least in part on data identifying an overall desired movement pattern of the flying surface 100 and/or plurality of flying vehicles 10). In other embodiments, the individual flying vehicles 10 may be configured for a centralized control configuration (or a hybrid control configuration), in which controllers of each of a plurality of flying vehicles 10 operate to execute control command received from a centralized controller configuration. In such embodiments, a controller 18 of a first flying vehicle 10 may operate as a centralized controller, configured to provide control commands to a plurality of other flying vehicles 10, whether those other flying vehicles 10 are located within a common flying surface 100 with the centralized control flying vehicle 10, within a swarm with the centralized control flying vehicle 10, and/or the like.

In certain embodiments, individual flying vehicles 10 are configured to take-off as singular units (or as small flying surfaces 100 of a small number of flying vehicles) and to join relative to one another in-flight to form a larger flying vehicle to operate as a singular aircraft. It should be understood that while the present disclosure focuses on dynamic attachment and detachment of flying vehicles 10 in-flight, these flying vehicles 10 may be attached and/or detached relative to one another when not in flight (e.g., while resting on a support surface).

Figure 4A:
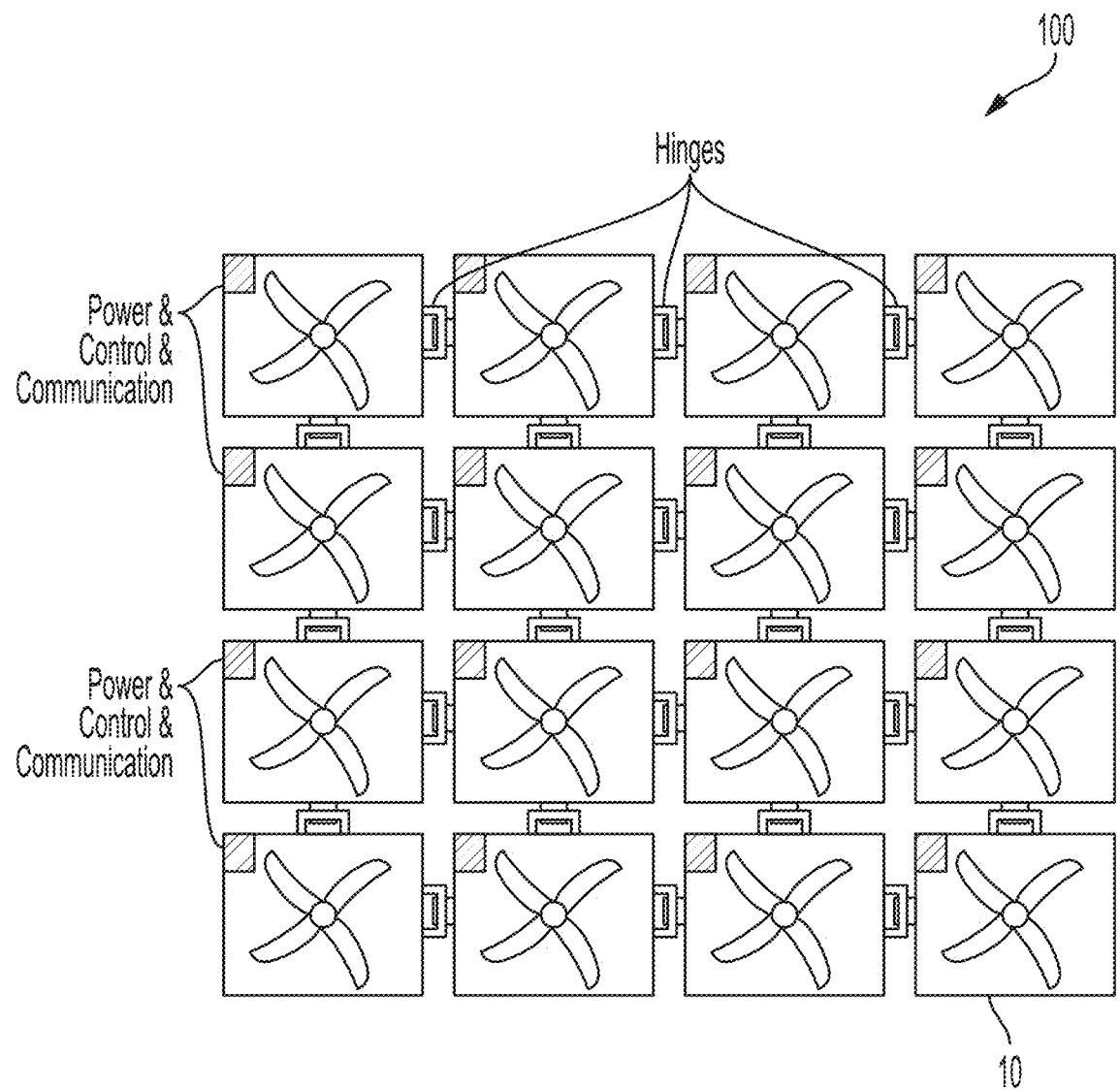
FIGS. 4A-4B are alternative schematic representations of various arrangements of flying vehicles having flexible joints therebetween to form flexible flying surfaces 100 according to certain embodiments.
Figure 4B:
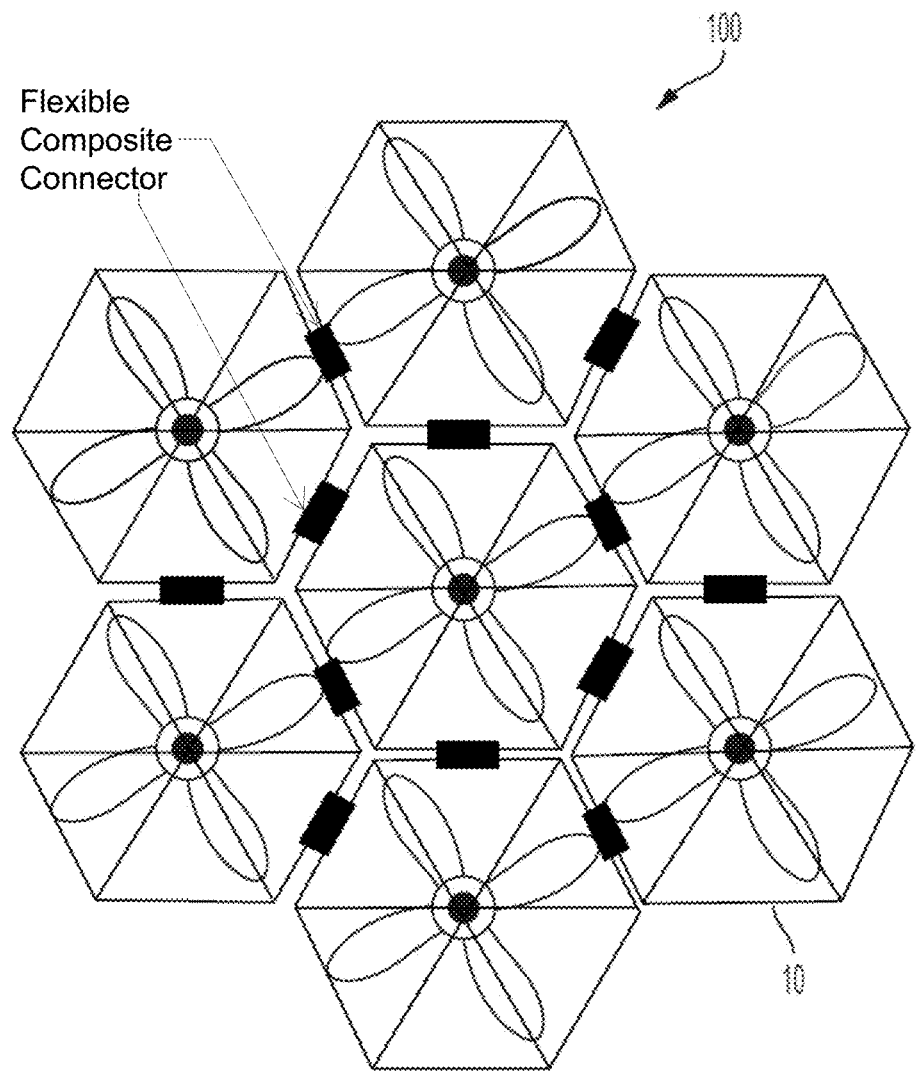

Flying vehicles 10, such as those discussed above, may attach relative to one another to form a flying surface 100, such as the example flying surface 100 illustrated in FIGS. 2-4B. As illustrated in the figures, the flying surface 100 may be embodied as an at least substantially rigid flying plank (e.g., as illustrated in FIG. 2) or as a flexible flying shroud (e.g., as illustrated in FIGS. 4A-4B, demonstrating hinged connectors 13 between flying vehicles 10 and flexible composite connectors 13, respectively).

Figure 17:
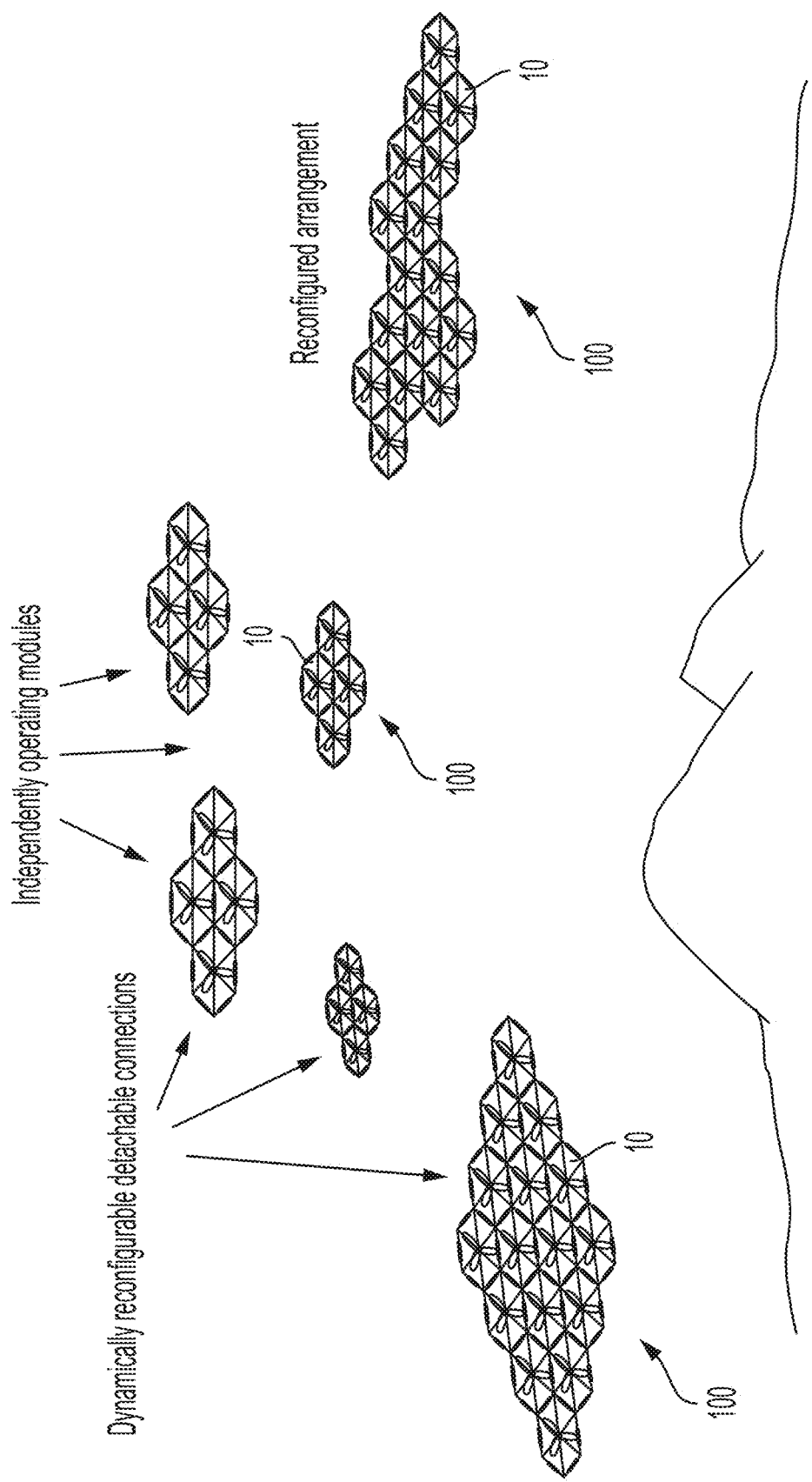
FIG. 17 schematically illustrates mid-air reconfiguration of flying surfaces 100 in accordance with certain embodiments.

As demonstrated at least by the illustrated connectors 13 of FIGS. 4A-4B, the connectors 13 may be configured for dynamic detachment via one of various mechanisms, such as reattaching joints, reconfigurable memory metals, electromagnetics, and/or the like as discussed herein. Such dynamic reconfiguration mechanisms enable a large number of reconfigurations to be possible through detachment and reattachment of different flying vehicles 10 during flight (e.g., as shown conceptually in FIG. 17). Such operation is at least in part enabled by the autonomy of each flying vehicle 10 having its own energy source, communication and control units, navigation, thrust units, and/or the like.

Figure 18A:
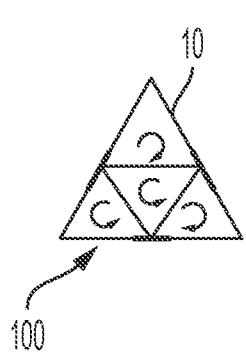
FIGS. 18A-18H illustrate various flying surface 100 configurations according to certain embodiments.
Figure 18B:
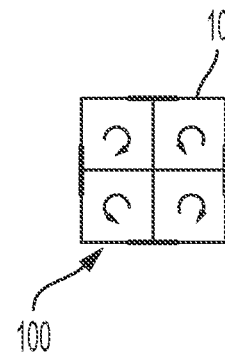
Figure 18C:
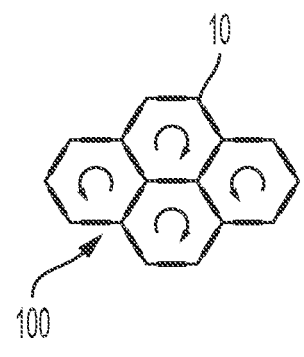
Figure 18D:
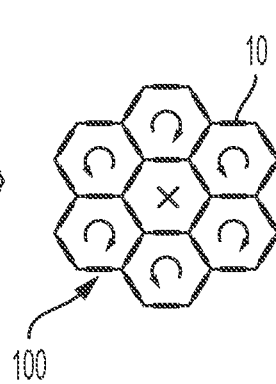
Figure 18E:
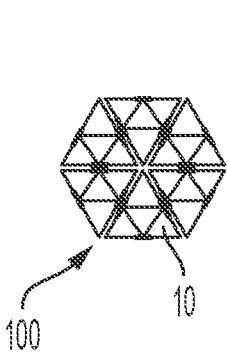
Figure 18F:
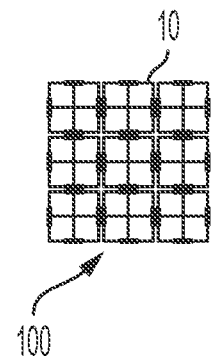
Figure 18G:
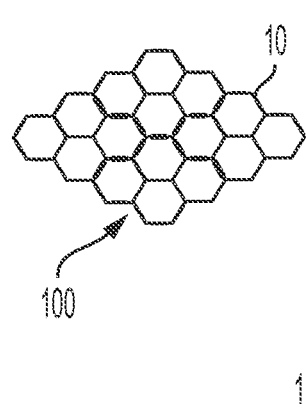
Figure 18H:
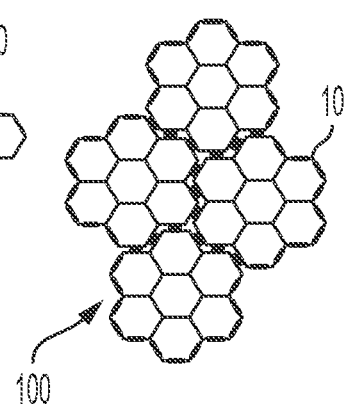

While many configurations of flying surfaces 100 and subsets (e.g., small numbers of interconnected flying vehicles 10) are possible and none is excluded here (explicitly or implicitly), certain arrangements of thrust units (e.g., motors 14 and corresponding propellers 15) within flying vehicles 10 have been found to offer advantages. For example, in the exemplary embodiment of FIGS. 18A-18H, small subdivisions of a flying surface 100 comprise at least four flying vehicles 10 (which may be independently controllable to provide a distributed control model for the small subdivisions of the flying surfaces 100) that are mechanically connected to form joints therebetween to provide full attitude and thrust control without any counteracting torque effect. As examples shown in FIG. 18A-18H, a flying surface 100 may comprise 4 triangular flying vehicles 10 attached relative to one another as shown in FIG. 18A. The flying surface 100 of FIG. 18A may be secured to relative to other, identically configured flying surface 100 to form a larger flying surface 100, such as that shown schematically in FIG. 18E. As another example, a flying surface 100 may comprise 4 square flying vehicles 10 attached relative to one another as shown in the configuration of FIG. 18B. The flying surfaces 100 of FIG. 18B may be attached relative to other flying surfaces 100 to form a larger flying surface 100, such as that shown in FIG. 18F. As yet another example, a flying surface 100 may comprise 4 hexagonal flying vehicles attached relative to one another as shown in FIG. 18C. The flying surfaces 100 of FIG. 18C may be attached relative to other flying surfaces 100 to form a larger flying surface 100, such as that shown in FIG. 18G. In other embodiments, a flying surface 100 may comprise 7 hexagonal flying surfaces 100, such as that shown in FIG. 18D. The flying surfaces 100 of FIG. 18D may be attached relative to one another to form a larger flying surface 100, such as that shown in FIG. 18H.

It should be understood that the illustrated embodiments of FIGS. 18A-18H are merely examples, and other configurations may be provided in accordance with various embodiments.

Such reconfigurability can enable a broad range of applications, such as switching between a flying surface 100 and a swarm, service to monitor a broad swath of land in a short period of time, providing an ad hoc communication network over a wide geographic area (e.g., by supporting communication equipment with one or more flying surfaces 100) while enabling the return of individual flying vehicles 10 before those flying vehicles 10 fail. As other examples, reconfiguration of flying vehicles between swarm and flying surface 100 configurations enable those flying vehicles 10 to move through narrow and/or difficult to access areas, to provide redundancy in hazardous operational areas or in search and rescue operations, such as in collapsed buildings or other structures where the potential for multiple unit failure or damage is high, while maintaining the ability to form a larger aircraft embodied as a flying surface 100.

In various embodiments, a large array of small, substantially similar flying vehicles 10 configured for independent control of the power and direction of operation of the propeller (or other thrust unit) may be assembled into a flying surface 100. Such a flying surface 100 may be internally rigid or flexible, or a combination thereof (e.g., having one or more rigid joints and one or more flexible joints), or having joints with dynamically adjustable rigidity. Both present useful mechanical and aerodynamic properties not achievable with existing aircraft. For example, rigid flying planks having distributed thrust vectors that may be adjusted independently, thereby enabling the performance of a broad range of dynamic maneuvers, movements, and attitude control actions in a very seamless and effective fashion. Furthermore, such flying surfaces 100 utilizing a large number of small, independently controllable flying vehicles 10 with independently controllable thrust units provides a more robust overall aircraft in the case of failure of one or more individual flying vehicles 10.

In various embodiments, the plurality of flying vehicles 10 may be configured for operation collectively as a flying surface 100, collectively as a swarm, or individually as separate flying vehicles 10. In a swarm configuration, the plurality of flying vehicles 10 remain physically detached from one another, but operate collectively, so as to maintain desired distances between adjacent flying vehicles 10 within the swarm. In yet other embodiments, a plurality of flying surfaces 100 each comprising a plurality of flying vehicles 10 may operate collectively as a swarm, so as to maintain a desired distance between adjacent flying surfaces 100.

With reference again to FIG. 17, flying vehicles 10 and/or flying surfaces 100 may be configured for dynamic reconfiguration mid-flight. For example, one or more flying vehicles 10 may be configured to join relative to one another mid-flight to form a flying surface 100. Similarly, one or more flying surfaces 100 may join relative to one another mid-flight to form a larger flying surface 100.

Figure 19:
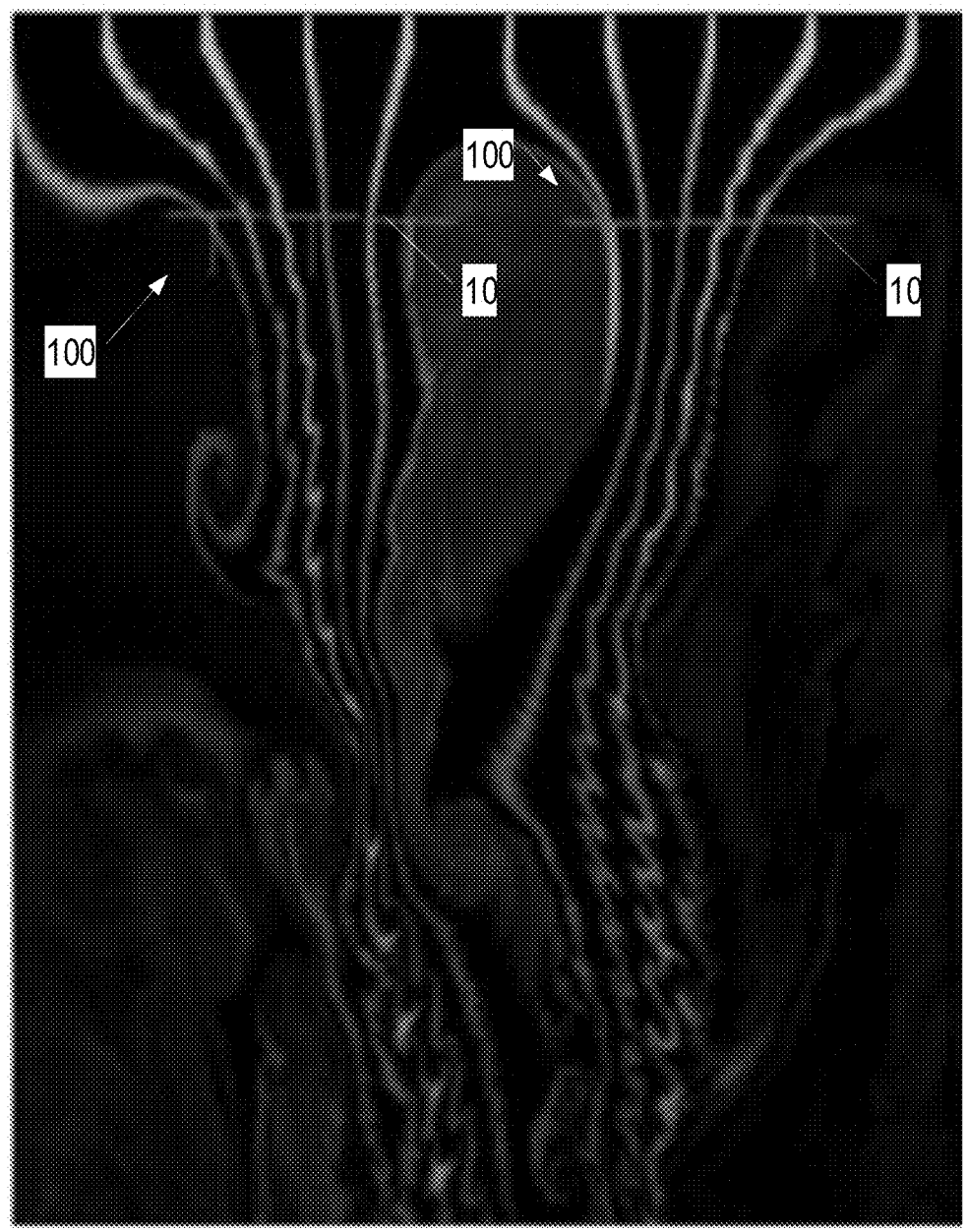
FIGS. 19-20 illustrate air flow diagrams demonstrating air flow through flying surfaces 100 approaching one another to join mid-flight, according to one embodiment.
Figure 20:
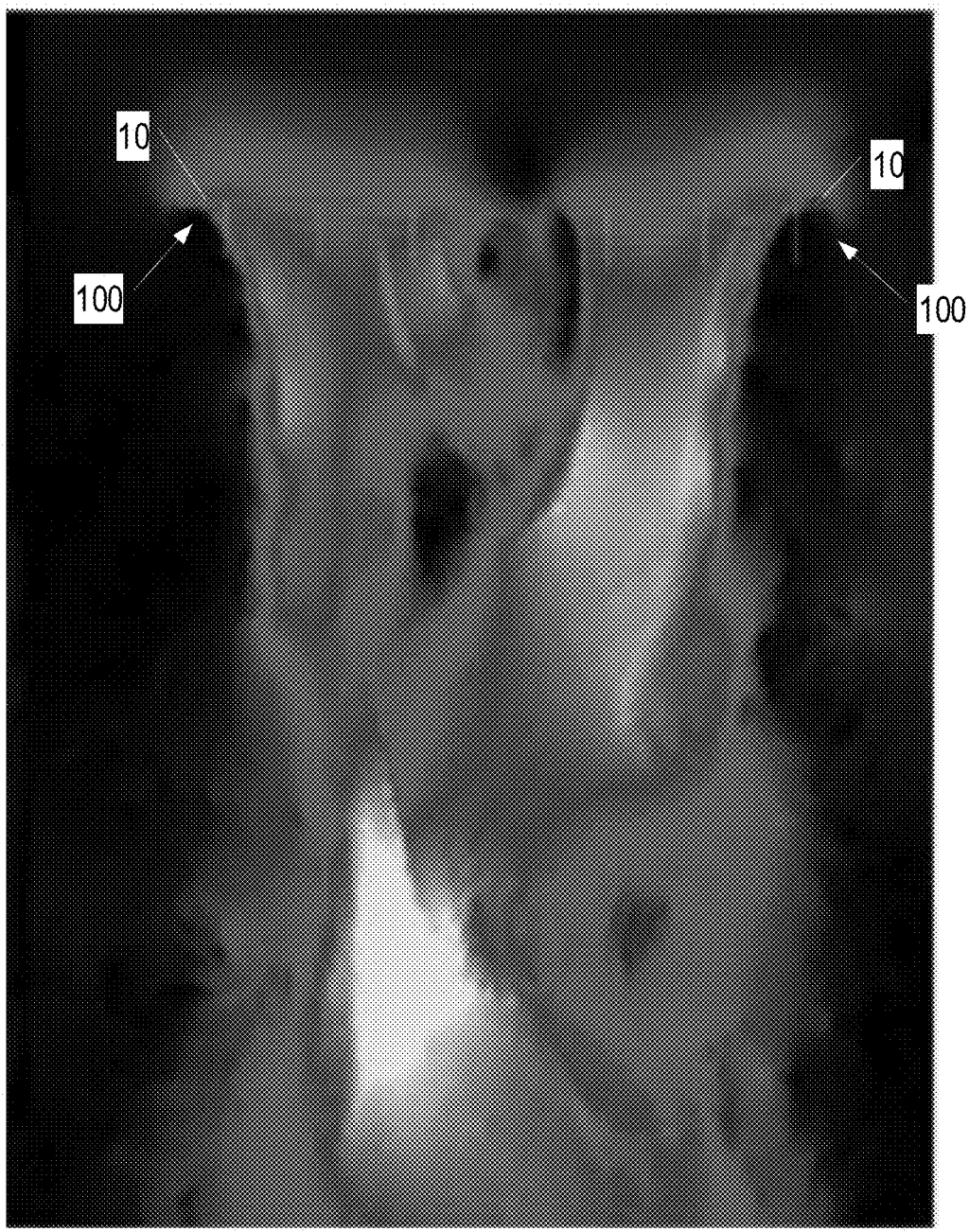

When one or more flying vehicles 10 (whether individually or as a flying surface 100) join relative to other flying surfaces 100 mid-flight, the flying vehicles 10 may utilize one or more sensors (e.g., proximity sensors, vision sensors, and/or the like) to detect the presence of a nearby other flying vehicle 10 for connection therewith. As the flying vehicles 10 approach one another, the onboard controllers of the flying vehicles 10 monitor relative movement of respective flying vehicles 10, including effects of air turbulence caused by the approaching adjacent flying vehicles (e.g., such air turbulence is illustrated in FIGS. 19-20, which demonstrates the air turbulence caused by two flying surfaces 100, each comprising three flying vehicles 10 approaching one another). As the flying vehicles 10 approach one another, the flying vehicles 10 are configured to engage connectors of respective vehicles to form joints therebetween. As discussed herein the connectors may comprise press-fit connectors configured to engage and form joints therebetween upon application of appropriate force. In other embodiments, the connectors may comprise actuators (or other active elements) configured to be engaged upon a trigger event (e.g., upon detecting that the connectors are pressed together) to form a joint. The action of connectors to form/detach from joints may, in certain embodiments, be aided or guided at least in part through wireless communications between the adjacent flying vehicles 10 (e.g., based at least in part on a strength of a wireless communication signal, indicative of a distance between flying vehicles 10, based at least in part on the content of a wireless communication, which may indicate whether another flying vehicle 10 has detected contact between flying vehicles 10, and/or the like).

Moreover, the flying surfaces 100 may be configured to detach mid-flight in certain embodiments. As discussed above, the joints may be formed by actuatable connectors that may be disengaged mid-flight (e.g., by controlling an actuator within the connectors to disengage the connectors). Accordingly, one or more flying vehicles 10 and/or flying surfaces 100 may be configured to detach from one another, so as to enable independent movement of the flying vehicles and/or flying surfaces 100. For example, the flying vehicles 10 of a flying surface 100 may be configured to disengage from one another to form a flying swarm mid-flight (e.g., a flying swarm of a plurality of separated flying vehicles 10 or a flying swarm of a plurality of smaller flying surfaces 100). As another example, the flying vehicles 10 may be configured to disengage from one another to accomplish independent tasks (e.g., a smaller flying surface 100 may detach from a larger flying surface 100 to perform tasks away from the larger flying surface 100).

Similarly, the flying vehicles 10 of a flying surface 100 may be configured to detach mid-flight and reattach mid-flight, for example, to reconfigure the shape of a flying surface 100. As just one example, a flying surface 100 may be configured to remain in a first configuration optimized for efficient travel through air during a first period of time (e.g., until arrival at a desired destination), and to reconfigure into a second configuration optimized for object configuration during a second period of time (e.g., after arrival at the desired destination). It should be understood that any of a variety of configurations may be provided in accordance with certain embodiments.

Example Use Cases

Flying vehicles and/or flying surfaces 100 as discussed herein may be utilized in various implementations, such as surveillance implementations, object delivery implementations, object manipulation implementations, airflow manipulation, search and rescue, dynamically deployable communication hub or base stations, and/or the like.

In surveillance implementations, one or more flying vehicles 10 may comprise a camera, microphone, or other surveillance devices. In other embodiments, one or more flying vehicles 10 may be configured to support a camera, microphone or other surveillance devices (e.g., a flying vehicle 10 may independently support a camera or microphone, or a plurality of flying vehicles 10 forming a flying surface 100 may be configured to collectively support a camera or microphone).

To conduct surveillance, a plurality of flying vehicles 10 may operate collectively to support one or more surveillance devices during transit to a surveillance destination. The plurality of flying vehicles 10 may operate as physically separate devices (e.g., as a swarm), the plurality of flying vehicles 10 may operate in one or more flying surfaces 100, or a combination thereof (e.g., a swarm of flying surfaces 100). In certain embodiments, the plurality of flying vehicles 10 may be configured to change between various configurations (e.g., between a swarm configuration and a single flying surface 100 configuration, or vice versa) depending on a phase of surveillance. For example, the plurality of flying vehicles 10 may be configured to travel to a surveillance destination in a first configuration (e.g., as a single flying surface 100) and to transition to a second configuration upon arrival at a surveillance destination (e.g., a plurality of physically separate flying surfaces 100 and/or a plurality of physically separate flying vehicles 10). As just one example, a plurality of flying vehicles 10 may be configured to travel to a surveillance destination as a single flying surface 100, and to split into a plurality of smaller flying surfaces 100 upon arrival at the surveillance destination, for example, to surround the surveillance destination to collect additional surveillance data via surveillance equipment supported by the flying surfaces 100.

As yet another example, the plurality of flying vehicles 10 may travel to a surveillance destination as a plurality of physically separate flying vehicles 10, for example, to minimize the possibility of detection of all flying vehicles 10 travelling to the surveillance destination, and/or to facilitate maneuvering the flying vehicles 10 through one or more small openings, apertures, and/or the like (e.g., to enter a building or other structure) along the travel path of the flying vehicles 10 to the surveillance destination. Upon arrival at the surveillance destination, the plurality of flying vehicles 10 may be configured to reconfigure into one or more flying surfaces 100, for example, to increase the stability of the flying vehicles 10 supporting the surveillance equipment. As yet another example, upon arrival at the surveillance destination, the plurality of flying vehicles 10 may be configured to reconfigure into one or more flying surfaces 100, wherein the flying surfaces 100 each comprise a first flying vehicle 10 comprising a camera (or other surveillance equipment) and a second flying vehicle 10 comprising a wireless data transmitter configured for long-range wireless communication to convey surveillance data collected by the camera to a separate location. In such embodiments, the plurality of flying vehicles 10 may be configured for data transmission (e.g., wired data transmission) therebetween, so as to facilitate data transmission from the camera (or other surveillance equipment) to the wireless data transmitter.

As yet another example implementation, various embodiments may be configured for delivery of objects. As each flying vehicle 10 may have a weight capacity for supporting objects, various embodiments are configured to provide flying surfaces 100 having a weight capacity (as defined by the collective weight capacity of the included flying vehicles 10) sufficient to carry a particular object. In certain embodiments, one or more flying vehicles 10 may comprise an object support (e.g., a basket, an articulatable claw, a clamp, and/or the like) configured for supporting an object for delivery. In other embodiments, a flying vehicle 10 may comprise only a portion of an object support, which may be configured to collectively support an object together with one or more additional flying vehicles 10 comprising corresponding portions of an object support. Thus, a plurality of flying vehicles 10 may be collectively configured to support an object larger than a single flying vehicle 10 itself.

As just one example, the one or more connectors may be configured as object supports (or portions of object supports), such that one or more flying vehicles 10 may be configured to engage an object in a manner similar to that discussed above for engaging multiple flying vehicles relative to one another. Thus, a flying vehicle 10 may be configured to approach, contact, and/or engage connectors on an object, such that the flying vehicle 10 is configured to support an object by forming a joint with the object.

In certain embodiments, the flying surface 100 may be configured to incorporate redundant support for a carried object. For example, a plurality of flying vehicles 10 may each engage and support an object for delivery (or for other uses), such that detachment of one or more flying vehicles 10 does not cause the flying surface 100 to drop the supported object. Thus, during extended delivery routes (or extended time periods during which an object is to be held by a flying surface, such as supporting a wireless data network repeater), flying vehicles 10 may be periodically removed from the flying surface 100 and replaced with other flying vehicles 10 (e.g., having charged power units, having functional thrust units, and/or the like) without dropping the supported object.

It should be understood that object delivery functionality may be utilized in a variety of contexts, including delivery of shipped objects, such as to fulfill an order, humanitarian efforts, such as delivery of food and/or water to regions or individuals (e.g., in disaster areas), and/or the like. Object delivery functionality may be combined with surveillance functionality in certain embodiments, such as in search-and-rescue operations, where one or more flying vehicles 10 and/or flying surfaces 100 may be configured to search for individuals and to delivery objects (e.g., food, water, first aid supplies) before rescue personnel can arrive to provide support. Thus, in certain embodiments, a flying surface 100 may comprise one or more flying vehicles 10 supporting/encompassing surveillance equipment (e.g., cameras, vision sensors, LIDAR sensors, radar sensors, heat sensors, and/or the like) configured to facilitate a search for individuals/regions/objects, and the same flying surface may comprise one or more flying vehicles 10 configured for supporting an object for delivery (or manipulation, as discussed in greater detail herein). In certain embodiments, one or more flying vehicles 10 may be configured to support both surveillance equipment and one or more objects for delivery.

In certain embodiments, a swarm of a plurality of flying vehicles 10 and/or flying surfaces 100 may be configured to perform surveillance and object delivery functionalities collectively. For example, a first flying surface 100 may be configured for object delivery (and/or object manipulation) and a second flying surface 100 may be configured for surveillance. In such an embodiment, the movement patterns of the first flying surface 100, such as destinations, where to release a supported object, and/or the like, may be dictated at least in part by data generated by the second flying surface 100. For example, the second flying surface 100 may identify an individual person within a disaster zone (e.g., a collapsed building that is inaccessible to rescue personnel) and may provide data to the first flying surface 100 indicating where the first flying surface 100 should deliver carried objects to the location of the identified individual person. Such embodiments may utilize a hybrid control configuration, wherein the second flying surface 100 provides (e.g., transmits) data regarding a desired location for travel to the first flying surface 100, and the first flying surface 100 modifies/adjusts the received data so as to best carry out the desired task (e.g., adjusting the exact delivery location to accommodate differences between the exact location of the carried object within the flying surface 100 and a side edge of the flying surface 100).

As another example use case, a flying surface 100 may be utilized to manipulate an object, for example, utilizing one or more flying vehicles 10 to contact or otherwise engage an object, and utilizing other flying vehicles 10 within the same flying surface 100 as additional thrust, so as to enable the flying surface 100 as a whole capable of lifting, spinning, flipping, turning, or otherwise manipulating an object. The object manipulation use case may be a part of an object delivery use case, or may be a separate use case, such as in industrial settings, manufacturing settings, and/or the like.

In one example, parts of the flexible flying surface can conform to the object to be manipulated or handled and effectively grab it. The ability to grab objects can be further enhanced by generating a suction force induced by one or more thrust units, which enables a grip (e.g., having an adjustable grip strength determined based at least in part on the suction force strength) enabling the flying surface 100 to move, lift, and/or manipulate the target object. As discussed above, thrust units of certain flying vehicles 10 may be configured to reverse direction so as to reverse the direction of provided thrust of the flying vehicle 10. Such configurations enable flying vehicles 10 to create a suction force by creating a reverse thrust against a surface of an object to be manipulated. The amount of thrust (or suction) may be adjusted by changing the output of the thrust unit, so as to enable rotation, lift, release, or other manipulation movements of an object by one or more flying vehicles 10 within a flying surface 100. In certain embodiments, the one or more flying vehicles 10 may comprise one or more sensors (e.g., disposed within a sensor array) configured to detect appropriate holding forces to perform various object manipulation movements. For example, one or more pressure sensors, contact sensors, and/or the like, may be configured to detect when a flying vehicle 10 is in contact with an object, to detect if the object is slipping relative to the flying vehicle 10 (e.g., indicating that a greater suction/holding force is necessary for object holding), and/or the like, so as to perform highly precise object manipulation movements.

In certain embodiments, one or more flying vehicles 10 within a flying surface 100 may comprise one or more object manipulation features, such as hooks, high-friction pads, actuatable claws, and/or the like configured for engaging one or more surfaces of an object. In certain embodiments, the manipulation features may be specifically configured for engaging a particular shape of object (e.g., a cube (e.g., a box in delivery setting), an envelope in delivery settings, an engine block in a manufacturing setting, and/or the like). In other embodiments, the manipulation features may be configured for engaging a variety of shapes, such as via a conformable engagement feature. As discussed above in the context of object delivery, flying surfaces 100 of certain embodiments comprise redundant object manipulation features, such that one or more flying vehicles 10 may be replaced from the flying surface 100 while supporting/manipulating an object, such that the flying surface 100 does not drop the object.

In object manipulation settings, a flying surface 100 may be characterized by flexible joints between at least a portion of flying vehicles 10 within the flying surface 100. The flexible joints enable relative movement of flying vehicles 10 within the flying surface 100, thereby enabling at least a portion of flying vehicles 10 to adjust their position relative to the object, thereby enabling engagement between the flying surface 100 and the object so as to enable object manipulation. Moreover, the controllers of the included flying vehicles 10 are configured to utilize object manipulation movement models for controlling included thrust units, thereby enabling movement patterns for performing one or more object manipulation tasks, such as lifting an object, lifting one side of an object (e.g., to flip an object), moving opposite sides of an object (e.g., to spin an object), and/or the like. Other object manipulation tasks may be performed in accordance with appropriate control models executed by the one or more controllers of the flying vehicles 10 (e.g., in a distributed control system or a centralized control system).

As yet another example usage, a flying surface 100 may be utilized for airflow manipulation, such as to redirect a flow of air to a desired location. In certain embodiments, a flying surface 100 may be utilized to redirect an airflow within a closed environment (e.g., within a building). As other examples, one or more flying surfaces 100 may operate in concert to redirect an airflow within an open environment, such as redirecting a flow of smoke in an urban environment.

In such embodiments, a flying surface 100 may be implemented as a rigid flying surface 100, in which case an airflow may be redirected in a direction normal to a plane defined by the rigid flying surface 100. In other embodiments, a flying surface 100 may be flexible flying surface 100, in which case various flying vehicles 10 within the flying surface 100 may be directed in a manner so as to maintain a desired, stationary position of the flying surface 100 (e.g., mid-air) while redirecting an air flow. For example, certain flying vehicles 10 may be positioned to provide supporting thrust for the flying surface 100, while others of the flying vehicles 10 within the flying surface 100 are configured to redirect an air flow as desired.

As yet another example usage, a flying surface 100 or a plurality of flying surfaces 100 may be configured as a communication hub, a communication network edge transmitter, a network repeater, and/or the like. In such embodiments, one or more flying vehicles 10 (e.g., independently or collectively) may support or encompass one or more network communication transceivers, routers, repeaters, antennae, and/or the like, configured to provide network connectivity to nearby devices. Thus, in use, one or more flying surfaces 100 may be deployed to particular areas, such as areas without network connectivity (e.g., areas of natural disaster, areas with limited network connectivity, such as highly mountainous regions, and/or the like) so as to increase network coverage in those areas, without requiring stationary networking towers, antennae, receivers, transmitters, and/or the like. Due at least in part to the modular, dynamically reconfigurable nature of the flying surfaces 100, the flying surfaces 100 may remain in place over extended periods of time to provide continuous, at least substantially uninterrupted connectivity to a particular area. As individual flying vehicles 10 within the flying surface 100 run low on power (e.g., electrical power), those flying vehicles 10 may detach from the flying surface 100, and replacement flying vehicles 10 may attach to the flying surface 100 so as to maintain desired levels of thrust for the flying surface 100. The diminished power flying vehicles 10 may return to a base or other power-replenishment areas (e.g., a volume of air proximate/above a wireless power transmitter) before redeployment.

As yet another example use case, a flying surface 100 comprising a plurality of flying vehicles 10 may be configured to catch and support an object during flight. As just one example, a flying surface 100 comprising a plurality of flying vehicles may operate as a net, to capture a falling object by positioning the flying surface 100 under the falling object. In certain implementations of such embodiments, the flying surface 100 may comprise one or more flying vehicles 10 supporting/encompassing surveillance equipment configured to detect a falling object and to provide command data to a plurality of controllers 18 of flying vehicles 10 within the flying surface 100 to cause the flying surface 100 to move under the falling object. As discussed herein, implementations configured for such usage may encompass flying vehicles 10 having protective mesh, grids, surfaces, and/or the like covering included thrust units, so as to avoid damage to the falling object and/or the flying vehicles 10 that could result from catching a falling object. In other embodiments, it should be understood that various flying vehicles 10 may be configured for one-time-use in catching a falling object, as flying vehicles 10 that absorb force resulting from catching the falling object may be damaged as a result of the absorbed force. In such embodiments, the flying surface 100 may be configured to provide sufficient thrust to support the falling object and any objects expected to be damaged during the catch of the falling object. In other embodiments, flying surfaces 100 configured for catching falling objects may operate as a part of a swarm of flying vehicles 10 and/or flying objects 100, such that the flying surface 100 may be reconfigurable after catching a falling object to retain additional flying vehicles 10, as needed, to provide sufficient thrust to maintain the flying surface 100 in the air.

As another example, a flying surface 100 may be configured to fly along the flying path of a target aircraft and capture or neutralize the target aircraft. In various embodiments, one or more onboard sensors of one or more flying vehicles 10 (and/or sensors supported by a plurality of flying vehicles 10) within the flying surface 100 may be configured to identify and/or track a target aircraft. By identifying and/or tracking the target aircraft via onboard sensors, the flying surface 100 (e.g., via controllers 18 of individual flying vehicles 10 within the flying surface 100) may be configured to provide control signals to respective thrust units of individual flying vehicles 10 contained therein to move toward the identified and/or tracked target aircraft. By flying in the direction of the flight of the target aircraft, the flying surface 100 may be configured to reduce or minimize the relative impact between the target aircraft and the flying surface 100, enforcing a soft impact, to minimize any damage to the target aircraft and/or the flying surface 100. In various embodiments, the flying surface 100 may be configured to self-configure mid-flight (e.g., during a chase of the target aircraft) between a first configuration (e.g., configured to maximize speed), such a large mostly flat conformation for maximum thrust to a second configuration, such as a capture configuration embodied as a sack, cage, and/or the like to enclose the target aircraft when the flying surface 100 approaches and captures the target aircraft.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A flying vehicle comprising:
   a frame defining one or more sidewalls, wherein the frame has an open upper end and an open lower end;
   a thrust unit secured within the frame and configured to provide lift for the flying vehicle;
   a power unit in connection with the thrust unit;
   a controller configured to transmit control signals to the thrust unit; and
   a plurality of connectors positioned around an exterior surface of the frame, wherein the connectors are configured to engage external connectors of at least one adjacent flying vehicle, wherein the one or more connectors are configured to form a dynamically adjustable joint when engaged with external connectors of at least one adjacent flying vehicle, wherein the dynamically adjustable joint has a dynamically controllable rigidity adapted to be dynamically changed during flight so that the dynamically controllable rigidity has a first rigidity value during a first time interval while the flying vehicle is in flight and a second rigidity value during a second time interval while the flying vehicle is in flight, wherein said first value is different from said second value.

2. The flying vehicle of claim 1, further comprising a communication module configured to transmit status data to one or more additional flying vehicles.

3. The flying vehicle of claim 1, wherein the communication module is configured for wireless data transmission.

4. The flying vehicle of claim 1, wherein the controller is further configured to receive a master control signal from one of an additional flying vehicle prior to transmitting control signals to the thrust module.

5. The flying vehicle of claim 4, wherein the controller is configured to generate a control signal based at least in part on a distributed control configuration for a plurality of flying vehicles.

6. The flying vehicle of claim 1, wherein the controller is further configured to:
   generate master control signals for one or more additional flying vehicles; and
   transmit the master control signals to the one or more additional flying vehicles.

7. The flying vehicle of claim 1, further comprising an onboard power unit.

8. The flying vehicle of claim 1, wherein the flying vehicle comprises a power receiver configured to receive wireless power transmission from a power generation unit.

9. The flying vehicle of claim 8, wherein the power receiver is embodied as one or more antennae positioned within the thrust unit.

10. The flying vehicle of claim 1, wherein each of the plurality of connectors are hermaphrodite connectors.

11. The flying vehicle of claim 1, wherein the one or more connectors are configured to form an adjustable joint when engaged with external connectors of at least one adjacent flying vehicle, wherein the adjustable joint is configurable between a rigid configuration and a flexible configuration.

12. The flying vehicle of claim 1, wherein the thrust unit comprises an electric motor and propeller.

13. The flying vehicle of claim 1, further comprising one or more proximity sensors positioned on the frame, wherein the one or more proximity sensors are configured to detect an adjacent flying vehicle.

14. The flying vehicle of claim 1, wherein the thrust unit is reversible to selectably provide thrust in one of two opposing directions.

15. The flying vehicle of claim 1, further comprising one or more control surfaces configured to provide attitude adjustment to the flying vehicle.

* * * * *